United States Patent
Kannan et al.

(10) Patent No.: US 11,290,483 B1
(45) Date of Patent: Mar. 29, 2022

(54) PLATFORM FOR DEVELOPING HIGH EFFICACY DETECTION CONTENT

(71) Applicant: Anvilogic, Inc., Palo Alto, CA (US)

(72) Inventors: Karthik Kannan, Los Altos Hills, CA (US); Deb Banerjee, Cupertino, CA (US); Mackenzie Kyle, New York, NY (US); Kevin Gonzalez, Miami, FL (US); Jeswanth Manikonda, San Jose, CA (US)

(73) Assignee: ANVILOGIC, INC., Palo Alto, CA (US)

(*) Notice: Subject to any disclaimer, the term of this patent is extended or adjusted under 35 U.S.C. 154(b) by 0 days.

(21) Appl. No.: 17/223,509

(22) Filed: Apr. 6, 2021

Related U.S. Application Data

(60) Provisional application No. 63/006,567, filed on Apr. 7, 2020.

(51) Int. Cl.
*H04L 29/06* (2006.01)
(52) U.S. Cl.
CPC ...... *H04L 63/1433* (2013.01); *H04L 63/1416* (2013.01); *H04L 63/1425* (2013.01); *H04L 63/1466* (2013.01)
(58) Field of Classification Search
CPC ............ H04L 63/1433; H04L 63/1425; H04L 63/1416; H04L 63/1466
USPC ........................................................ 726/25
See application file for complete search history.

(56) References Cited

U.S. PATENT DOCUMENTS

| 7,599,870 | B2 * | 10/2009 | Merkoulovitch .. G06Q 10/0635 705/36 R |
| 8,392,997 | B2 * | 3/2013 | Chen ..................... G06F 21/577 726/25 |
| 9,288,220 | B2 | 3/2016 | Raugas et al. |
| 9,690,938 | B1 | 6/2017 | Saxe et al. |
| 9,747,570 | B1 * | 8/2017 | Vescio ................. G06F 21/577 |
| 9,990,495 | B2 | 6/2018 | Parinov et al. |
| 10,205,735 | B2 | 2/2019 | Apostolopoulos |
| 10,659,333 | B2 | 5/2020 | Sartran et al. |
| 10,692,032 | B2 | 6/2020 | Datta Ray |
| 10,785,247 | B2 | 9/2020 | Nikolaev et al. |

(Continued)

OTHER PUBLICATIONS

Co-pending U.S. Appl. No. 16/953,696, inventors Kannan; Karthik et al., filed Nov. 20, 2020.

(Continued)

*Primary Examiner* — Badri Narayanan
*Assistant Examiner* — Badri Champakesan
(74) *Attorney, Agent, or Firm* — Wilson Sonsini Goodrich & Rosati

(57) ABSTRACT

Described are platforms, systems, and methods for providing a threat scenario rule to detect a specified threat scenario use case. In one aspect, a method comprises: receiving, from an interface, a set of threat detection parameters; determining a set of recommended threat identifier use cases from a plurality of threat identifier use cases based on the set of threat detection parameters; providing, to the interface, the set of recommended threat identifier use cases; receiving, from the interface, a threat scenario use case comprising a selection of the set of recommended threat identifier use cases; determining a threat scenario rule comprising logic to detect the threat scenario use case; and providing the threat scenario rule to the interface.

27 Claims, 16 Drawing Sheets

(56) References Cited

U.S. PATENT DOCUMENTS

| | | | |
|---|---|---|---|
| 10,831,891 B2 | 11/2020 | Chistyakov et al. | |
| 10,878,090 B2 | 12/2020 | Chistyakov et al. | |
| 11,003,773 B1* | 5/2021 | Fang | G06N 20/00 |
| 2012/0159441 A1* | 6/2012 | Ghaisas | G06F 8/10 |
| | | | 717/123 |
| 2015/0058984 A1* | 2/2015 | Shen | G06F 21/568 |
| | | | 726/23 |
| 2015/0163242 A1* | 6/2015 | Laidlaw | H04L 63/1433 |
| | | | 726/22 |
| 2015/0172311 A1* | 6/2015 | Freedman | H04L 63/1441 |
| | | | 726/1 |
| 2016/0162690 A1* | 6/2016 | Reith | G06F 21/577 |
| | | | 726/25 |
| 2016/0231716 A1* | 8/2016 | Johnson | G05B 13/041 |
| 2016/0330219 A1 | 11/2016 | Hasan | |
| 2019/0260783 A1 | 8/2019 | Humphrey et al. | |
| 2020/0106787 A1* | 4/2020 | Galinski | G06F 9/54 |
| 2020/0160450 A1* | 5/2020 | Teotia | G06Q 40/06 |
| 2020/0251117 A1 | 8/2020 | Xu et al. | |
| 2020/0272734 A1* | 8/2020 | Tora | G06N 20/00 |
| 2020/0374305 A1* | 11/2020 | Kursun | G06N 20/00 |
| 2021/0075794 A1* | 3/2021 | Gazit | H04L 63/102 |

OTHER PUBLICATIONS

Co-pending U.S. Appl. No. 16/953,701, inventors Kannan; Karthik et al., filed Nov. 20, 2020.

U.S. Appl. No. 16/953,696 Non-Final Office Action dated Dec. 17, 2021.

* cited by examiner

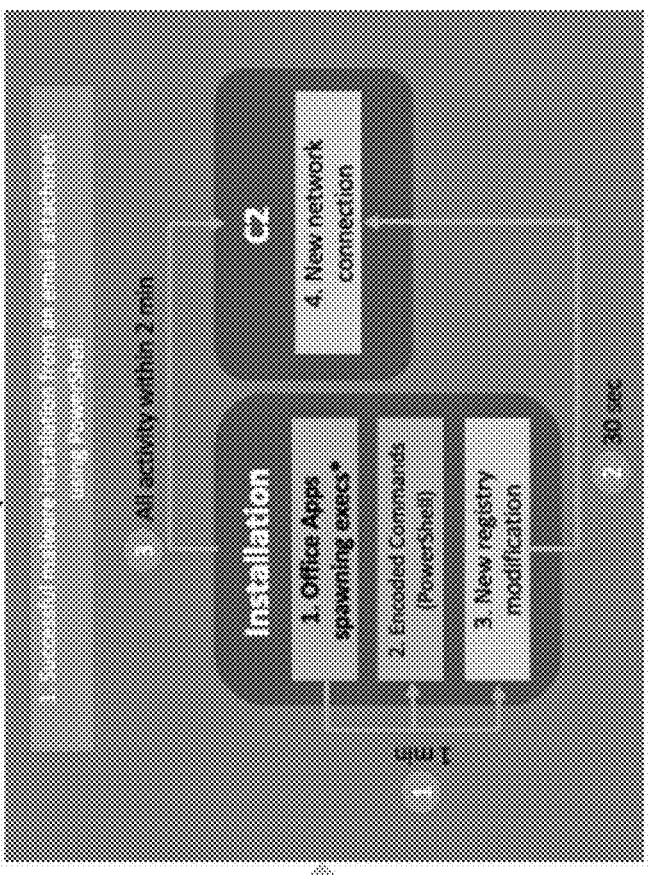
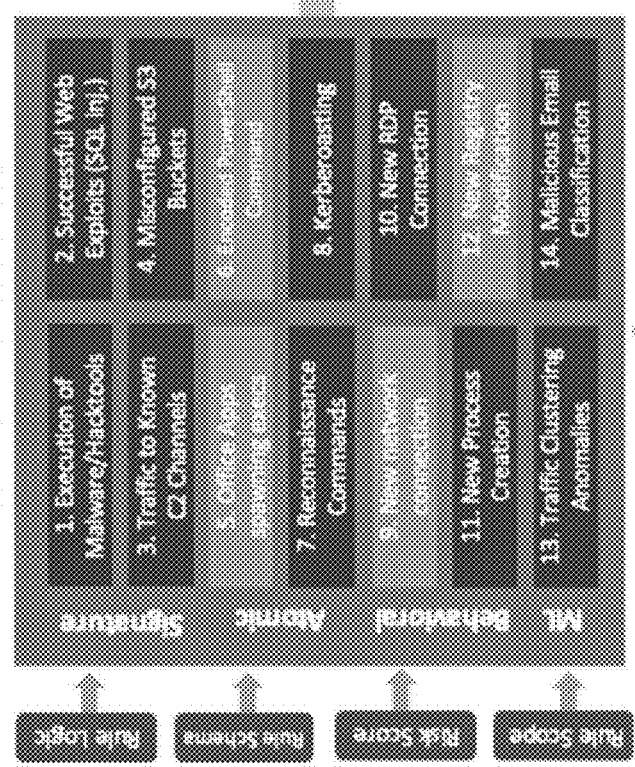
FIG. 2C

PLATFORM FOR DEVELOPING HIGH EFFICACY DETECTION CONTENT

CROSS-REFERENCE TO RELATED APPLICATIONS

This application claims the benefit of U.S. Application No. 63/006,567, filed Apr. 7, 2020, entitled "Platform for Developing High Efficacy Detection Content," the contents of which is incorporated herein by reference in its entirety for all purposes.

BACKGROUND

Cyber security includes technologies, processes, and practices designed to protect networks, devices, programs, users and data from attack, damage, theft or unauthorized access. The need for increased effectiveness and efficiencies in cyber security has increased as there are more devices within corporate networks as well as connected to the internet than ever before and, organizations (e.g., government, military, corporate, financial, medical, and so forth) collect, process, and store unprecedented amounts of data on such devices. Moreover, a significant portion of stored data includes sensitive information, such as intellectual property, financial data, personal information, and so forth. As such, unauthorized access or exposure to sensitive information can have negative consequences. As the volume and sophistication of cyber-attacks grow, enterprises, especially those that are tasked with safeguarding information relating to intellectual property, identity, national security, health, or financial records, must to take steps to protect sensitive business and personnel information.

SUMMARY

Embodiments of the present disclosure are generally directed to a platform for developing high efficacy detection content based on modularity, composition, collaboration, and attack scenarios.

Enterprise systems and services are constantly under attack by adversaries using a variety of threats that are characterized by their tactics, techniques, and procedures (TTPs). Enterprises have a variety of detection and preventions security products that require detection rules to be deployed that inspect multiple security event sources and event types to trigger an alert when specific conditional logic is matched. Cybersecurity Operations Centers (CSOCs or SOCs) are traditionally responsible for monitoring those alerts in order to detect, analyze, track, and mitigate cyber-security threats. The primary objective of SOCs is to protect and defend enterprises from malicious actors and being able to quickly detect attack activity is imperative to that mission. The key to detection is high quality content, and content development can often be difficult, poorly executed, and lacks reusability because it is built using proprietary methods that differ from enterprise to enterprise. Enterprise security analysts in the Security Operations Centers (SOC's) are responsible for developing detection content. As such, there are many problems with content development made worse by the lack of a platform to provide integrated content development, deployment, test, assessment, and error handling.

Disclosed herein is a centralized content development platform that encourages enterprises to follow a standardized framework and methodology for content, while also providing enterprises with high efficacy, threat intelligence driven use cases. The described content development platform provides a user interface (UI) driven experience for documenting, building, testing, modifying, reviewing, versioning, deploying, assessing, re-using, error handling, industry recommendations, industry sharing, and industry rating.

Rule development requires, for example, concepts to be successfully integrated and customized for a specific detection use cases for enterprise customer's environment. These rules must be tested, reviewed, and deployed for accuracy. Also, the efficacy and prevalence of deployed detection rules must be tracked for improvements recommendation, and assessments of rule value and relevance. The described content development platform provides an integrated environment for the development, testing, review, deployment, and assessment for SOC detection content, which significantly reduces the time to develop, test, and tune content for high efficacy and relevance.

The described content development platform provides a UI Experience that allows enterprises to build detection use cases. For example, in some embodiments, the described content development platform provides an interactive builder that allows analysts to create or use detection use case building blocks to create and modify complex correlations use cases to detect advanced threats. In some embodiments, the interactive builder provides drag and drop functionality.

The described content development platform provides for the sharing of content and facilitates collaboration among enterprises as currently there is a lack of content sharing and reuse within and across enterprises. Currently, peer wisdom and analytical methods is absent. There is little or no reuse in detection content from one rule to another because most detection rules are built monolithically and do not use compositions of modular rules. This makes the cost of developing new rules expensive in terms of time and skill required since each is built from the ground up, which can eventually add a lot of technical debt once the threat is no longer applicable.

The described content development platform provides analyst with information regarding the kinds of patterns, adversary types, and motives to devise the right type of content/logic to defend against these threats. This service is invaluable to enterprises as the threat landscape is vast, changes rapidly, and there are not enough skilled SOC analysts and threat hunters to satisfy enterprise needs, which can lead to enterprise detection gaps that allow for threats to go undetected.

The described content development platform has extensive and customization facilities that reduce false positives and decreases the amount of high alert volume as alerts generated by current SOC detection content are often inaccurate. Such inaccuracy leading to wasted effort. Also, often alerts lack context to help the analyst quickly triage, analyze and remediate. High false positive rates and alert volumes have negative impacts on the security organization because of 1) the increased time it takes for an analyst to properly triage and perform mitigation, containment, and remediation on attack activity when a successful breach does occur (dwell time), and (2) the increased fatigue caused to analysts. These issues can desensitize analysist to alerts, thus increasing response times, or worse, increasing the likelihood that a serious incident will be missed completely. Both dwell time and analyst fatigue could allow enough time for an adversary to perform their intended objectives.

The described content development platform provides for the efficient and accurate development of content by mapping content to the TTPs employed by adversaries. This knowledge allows analysts to write high efficacy content, which includes rules that detect events/artifacts left by TTPs and aligned to an attack scenario. The described content development platform also provides detailed intelligence that describes what an advanced attack looks like and how it can be detected resulting in artifacts that cover broader use cases and can be re-used.

The described content development platform provides data in a standard format or schema that allows for more advanced, multi-threat identifier correlation of rules and overall content that is flexible and scalable. The described content development platform also allows enterprises to create, share, or search methods to remediate when detection rules are not operating as expected. Additionally, described content development platform allows for enterprises to re-run (both automatically or manually) detection logic on, for example, recovered data sets impacted an outage.

Accordingly, in one aspect, described herein are computer-implemented methods for providing a threat scenario rule to detect a specified threat scenario use case. The methods are executed by one or more processors. The methods comprise: receiving, from an interface, a set of threat detection parameters; determining a set of recommended threat identifier use cases from a plurality of threat identifier use cases based on the set of threat detection parameters; providing, to the interface, the set of recommended threat identifier use cases; receiving, from the interface, a threat scenario use case comprising a selection of the set of recommended threat identifier use cases; determining a threat scenario rule comprising logic to detect the threat scenario use case; and providing the threat scenario rule to the interface. In some embodiments, the threat scenario rule is deployed to a Security Incident and Event Management (SIEM) to detect scenarios of interest (SOI) based on data collected at the SIEM from enterprise sources. In some embodiments, the SOI correspond to the threat scenario use case. In some embodiments, the data collected from the enterprise sources comprises raw event feeds or data models that align to logs application, endpoint, network, authentication, email, or cloud data sets. In some embodiments, the threat scenario rule comprises a threat identifier rule for each of the respective selections from the set of recommended threat identifier use cases. In some embodiments, each of the threat identifier rules is deployed at a STEM to detect events of interest (EOI) based on data collected from enterprise sources. In some embodiments, the EOI correspond to the respective threat identifier use case. In some embodiments, a mode is selected for each of the deployed threat identifier rules. In some embodiments, the mode is either an alert mode or a warn mode. In some embodiments, the threat scenario use case corresponds to an attack scenario or specific malicious activity. In some embodiments, the plurality of threat identifier use cases are determined by processing raw event data through a trained machine learning model. In some embodiments, the raw event data comprises enterprise log data of attacks and traffic detected on a respective network. In some embodiments, the machine learning model is retrained with the determined threat identifier use cases. In some embodiments, the set of recommended threat identifier use cases is determined according to a threat score assigned to each of the plurality of threat identifier use cases. In some embodiments, the threat score is determined according to the set of threat detection parameters. In some embodiments, the set of threat detection parameters comprise an industry type, a type of adversary to detect, or a type of attack to detect. In some embodiments, the plurality of threat identifier use cases are categorized as signature, behavioral, baseline, or machine learning. In some embodiments, the threat scenario use case is categorized as sequential correlation, risk threshold, or adversary recognition. In some embodiments, the threat scenario rule is provided via an application programming interface (API). In some embodiments, the threat scenario rule is provided to a custom container or application on top of a STEM. In some embodiments, the interface comprises a UI. In some embodiments, the methods comprise: receiving, from the interface, modifications to the threat scenario rule or versioning data for the threat scenario rule. In some embodiments, the threat scenario rule comprises at least one version. In some embodiments, the methods comprise: tracking efficacy of the threat scenario rule across the versions of the threat scenario rule. In some embodiments, the threat scenario rule is determined by modifying at least on existing threat scenario rule or combining a plurality of threat identifier rules. In some embodiments, at least one of the threat identifier rules is generated based on the selection of the set of recommended threat identifier use cases.

In another aspect, described herein are non-transitory computer-readable storage media coupled to one or more processors and having instructions stored thereon which, when executed by the one or more processors, cause the one or more processors to perform operations. These operations comprise: receiving, from an interface, a set of threat detection parameters; determining a set of recommended threat identifier use cases from a plurality of threat identifier use cases based on the set of threat detection parameters; providing, to the interface, the set of recommended threat identifier use cases; receiving, from the interface, a threat scenario use case comprising a selection of the set of recommended threat identifier use cases; determining a threat scenario rule comprising logic to detect the threat scenario use case; and providing the threat scenario rule to the interface. In some embodiments, the threat scenario rule is deployed to a SIEM to detect SOI based on data collected at the STEM from enterprise sources. In some embodiments, the SOI correspond to the threat scenario use case. In some embodiments, the data collected from the enterprise sources comprises raw event feeds or data models that align to logs application, endpoint, network, authentication, email, or cloud data sets. In some embodiments, the threat scenario rule comprises a threat identifier rule for each of the respective selections from the set of recommended threat identifier use cases. In some embodiments, each of the threat identifier rules is deployed at a STEM to detect EOI based on data collected from enterprise sources. In some embodiments, the EOI correspond to the respective threat identifier use case. In some embodiments, a mode is selected for each of the deployed threat identifier rules. In some embodiments, the mode is either an alert mode or a warn mode. In some embodiments, the threat scenario use case corresponds to an attack scenario or specific malicious activity. In some embodiments, the plurality of threat identifier use cases are determined by processing raw event data through a trained machine learning model. In some embodiments, the raw event data comprises enterprise log data of attacks and traffic detected on a respective network. In some embodiments, the machine learning model is retrained with the determined threat identifier use cases. In some embodiments, the set of recommended threat identifier use cases is determined according to a threat score assigned to each of the plurality of threat identifier use cases. In some embodiments, the threat score is determined according to the set of threat detection parameters. In some embodiments, the set of threat detection parameters comprise an industry type, a type of adversary to detect, or a type of attack to detect. In some embodiments, the plurality of threat identifier use cases are categorized as signature, behavioral, baseline, or machine learning. In some embodiments, the threat scenario use case is categorized as sequential correlation, risk threshold, or adversary recognition. In some embodiments, the threat scenario rule is provided via an application programming interface (API). In some embodiments, the threat scenario rule is provided to a custom container or application on top of a SIEM. In some embodiments, the interface comprises a UI. In some embodiments, the operations comprise: receiving, from the interface, modifications to the threat scenario rule or versioning data for the threat scenario rule. In some embodiments, the threat scenario rule comprises at least one version. In some embodiments, the operations comprise: tracking efficacy of the threat scenario rule across the versions of the threat scenario rule. In some embodiments, the threat scenario rule is determined by modifying at least on existing threat scenario rule or combining a plurality of threat identifier rules. In some embodiments, at least one of the threat identifier rules is generated based on the selection of the set of recommended threat identifier use cases.

In another aspect, described herein are systems for providing a threat scenario rule to detect a specified threat scenario use case. These systems comprise: an interface; one or more processors; and a computer-readable storage device coupled to the one or more processors and having instructions stored thereon which, when executed by the one or more processors, cause the one or more processors to perform operations. These operations comprise: receiving, from the interface, a set of threat detection parameters; determining a set of recommended threat identifier use cases from a plurality of threat identifier use cases based on the set of threat detection parameters; providing, to the interface, the set of recommended threat identifier use cases; receiving, from the interface, a threat scenario use case comprising a selection of the set of recommended threat identifier use cases; determining a threat scenario rule comprising logic to detect the threat scenario use case; and providing the threat scenario rule to the interface. In some embodiments, the threat scenario rule is deployed to a SIEM to detect SOI based on data collected at the STEM from enterprise sources. In some embodiments, the SOI correspond to the threat scenario use case. In some embodiments, the data collected from the enterprise sources comprises raw event feeds or data models that align to logs application, endpoint, network, authentication, email, or cloud data sets. In some embodiments, the threat scenario rule comprises a threat identifier rule for each of the respective selections from the set of recommended threat identifier use cases. In some embodiments, each of the threat identifier rules is deployed at a SIEM to detect EOI based on data collected from enterprise sources. In some embodiments, the EOI correspond to the respective threat identifier use case. In some embodiments, a mode is selected for each of the deployed threat identifier rules. In some embodiments, the mode is either an alert mode or a warn mode. In some embodiments, the threat scenario use case corresponds to an attack scenario or specific malicious activity. In some embodiments, the plurality of threat identifier use cases are determined by processing raw event data through a trained machine learning model. In some embodiments, the raw event data comprises enterprise log data of attacks and traffic detected on a respective network. In some embodiments, the machine learning model is retrained with the determined threat identifier use cases. In some embodiments, the set of recommended threat identifier use cases is determined according to a threat score assigned to each of the plurality of threat identifier use cases. In some embodiments, the threat score is determined according to the set of threat detection parameters. In some embodiments, the set of threat detection parameters comprise an industry type, a type of adversary to detect, or a type of attack to detect. In some embodiments, the plurality of threat identifier use cases are categorized as signature, behavioral, baseline, or machine learning. In some embodiments, the threat scenario use case is categorized as sequential correlation, risk threshold, or adversary recognition. In some embodiments, the threat scenario rule is provided via an application programming interface (API). In some embodiments, the threat scenario rule is provided to a custom container or application on top of a STEM. In some embodiments, the interface comprises a UI. In some embodiments, the operations comprise: receiving, from the interface, modifications to the threat scenario rule or versioning data for the threat scenario rule. In some embodiments, the threat scenario rule comprises at least one version. In some embodiments, the operations comprise: tracking efficacy of the threat scenario rule across the versions of the threat scenario rule. In some embodiments, the threat scenario rule is determined by modifying at least on existing threat scenario rule or combining a plurality of threat identifier rules. In some embodiments, at least one of the threat identifier rules is generated based on the selection of the set of recommended threat identifier use cases.

Particular embodiments of the subject matter described in this disclosure can be implemented so as to realize one or more of the following advantages. In some embodiments, the described content development platform, which includes a monitoring framework that enhances how security events are organized and correlated to help eliminate high volume alert occurrences, while at the same time improves the efficacy of alerts to help lower the rate of false positives detections. The described content development platform is not dependent on any specific type of STEM or technology as long as the detection technology can store time series machine data. The described content development platform promotes and provides analysts the opportunity to easily create content through a UI driven experience that detects patterns and scenarios that occur within an attack lifecycle instead of each time an individual threat identifier occurs. As such, use of the described platform improves the confidence in an alert, lowers the volume of alerts to a triage level, decreases dwell time to respond, and provides additional context (e.g., timeline of events), all of which improves the efficiency and efficacy of response.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more embodiments of the present disclosure are set forth in the accompanying drawings and the description below. Other features and advantages of the present disclosure will be apparent from the description and drawings, and from the claims.

BRIEF DESCRIPTION OF THE DRAWINGS

A better understanding of the features and advantages of the present subject matter will be obtained by reference to the following detailed description that sets forth illustrative embodiments and the accompanying drawings of which:

FIGS. 2A-2E depict examples of how threat identifier use cases can be used to correlate events based on, for example, an attack scenario used to trigger an alert for a SOC analyst to triage;

DETAILED DESCRIPTION

Figure 1A:
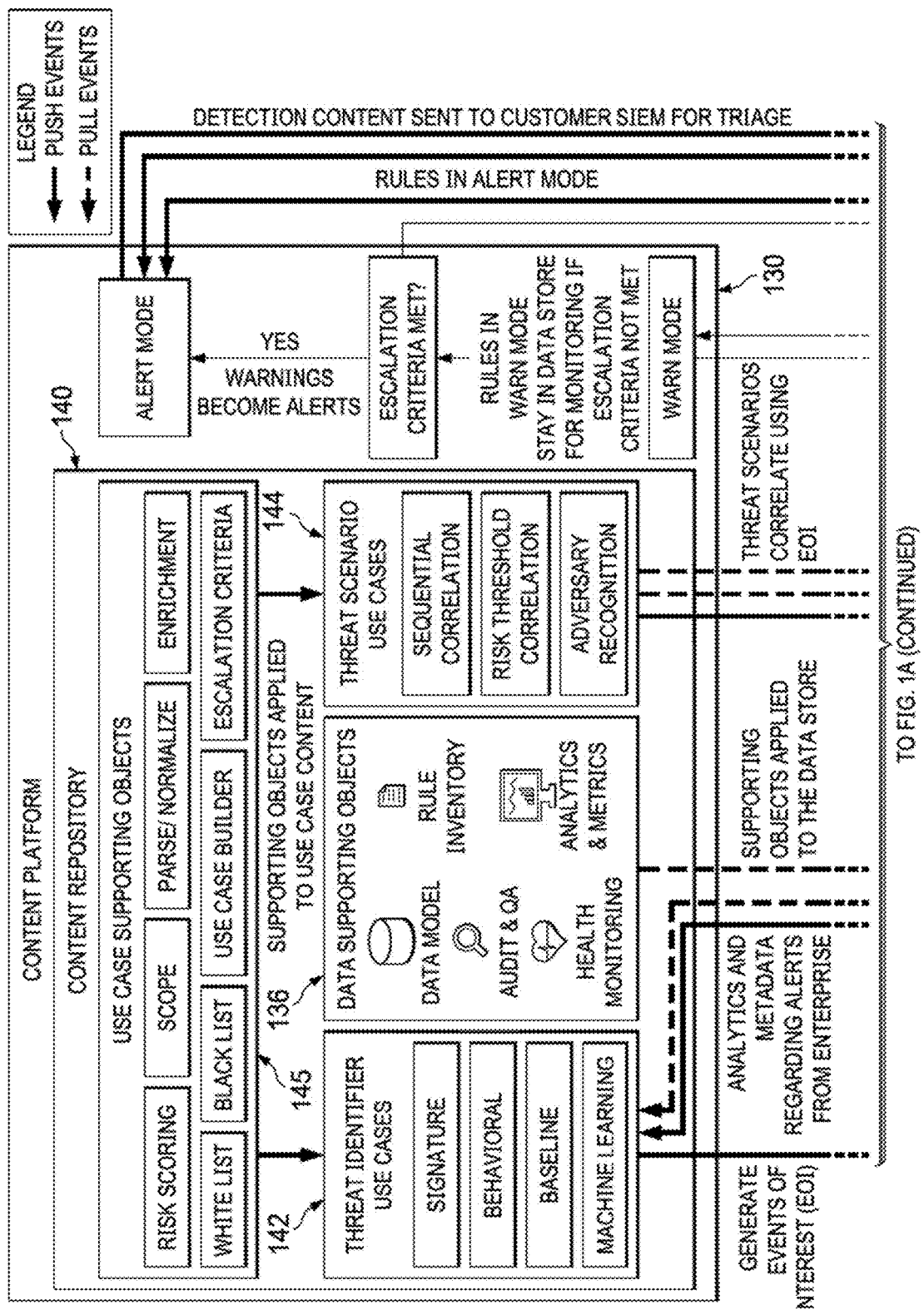
FIGS. 1A and 1B depict example content frameworks that can be provided via the described content development platform.
Figure 1A:
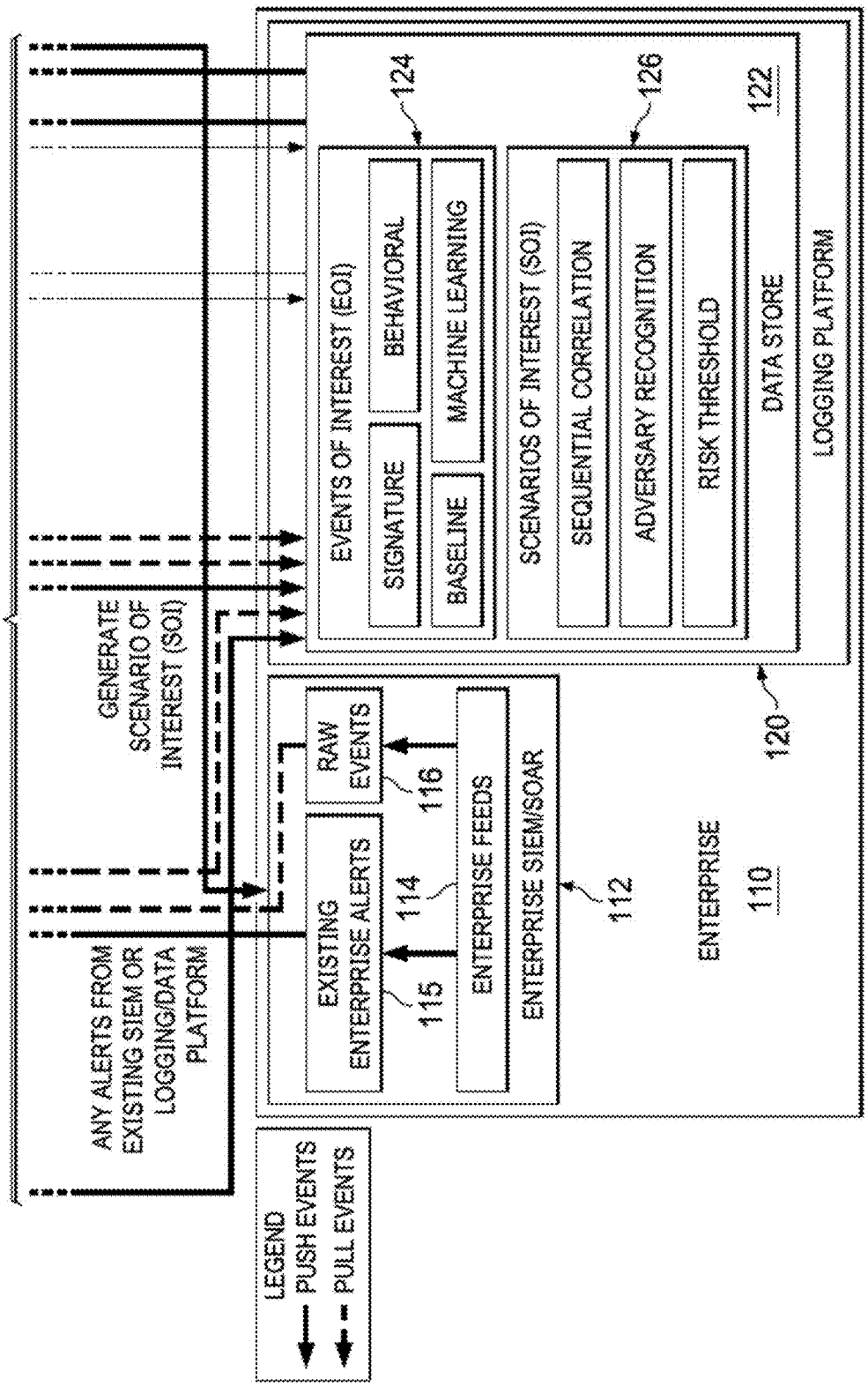

Described herein, in certain embodiments, are computer-implemented methods for providing a threat scenario rule to detect a specified threat scenario use case. The methods comprising: receiving, from an interface, a set of threat detection parameters; determining a set of recommended threat identifier use cases from a plurality of threat identifier use cases based on the set of threat detection parameters; providing, to the interface, the set of recommended threat identifier use cases; receiving, from the interface, a threat scenario use case comprising a selection of the set of recommended threat identifier use cases; determining a threat scenario rule comprising logic to detect the threat scenario use case; and providing the threat scenario rule to the interface.

Also described herein, in certain embodiments, are non-transitory computer-readable storage media coupled to one or more processors and having instructions stored thereon which, when executed by the one or more processors, cause the one or more processors to perform operations comprising: receiving, from an interface, a set of threat detection parameters; determining a set of recommended threat identifier use cases from a plurality of threat identifier use cases based on the set of threat detection parameters; providing, to the interface, the set of recommended threat identifier use cases; receiving, from the interface, a threat scenario use case comprising a selection of the set of recommended threat identifier use cases; determining a threat scenario rule comprising logic to detect the threat scenario use case; and providing the threat scenario rule to the interface.

Also described herein, in certain embodiments, are systems for providing a threat scenario rule to detect a specified threat scenario use case. These systems comprise: an interface; one or more processors; and a computer-readable storage device coupled to the one or more processors and having instructions stored thereon which, when executed by the one or more processors, cause the one or more processors to perform operations. These operations comprise: receiving, from the interface, a set of threat detection parameters; determining a set of recommended threat identifier use cases from a plurality of threat identifier use cases based on the set of threat detection parameters; providing, to the interface, the set of recommended threat identifier use cases; receiving, from the interface, a threat scenario use case comprising a selection of the set of recommended threat identifier use cases; determining a threat scenario rule comprising logic to detect the threat scenario use case; and providing the threat scenario rule to the interface.

Certain Definitions

Unless otherwise defined, all technical terms used herein have the same meaning as commonly understood by one of ordinary skill in the art to which this disclosure belongs.

Unless otherwise defined, all technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/or" unless otherwise stated.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure.

As used herein, the term "meta-data" includes ratings, rankings, context, feedback, and so forth.

As used herein, the term "threat landscape" or "enterprise threat landscape" includes a set of adversaries and the tactics, techniques, and procedures employed by these adversaries to attack an enterprise(s) with a variety of TTPs. In some embodiments, the threat landscape includes vulnerabilities in an enterprise as well as information technology (IT) asset criticality, which may be employed to identify threat procedures that require detection rules. In some embodiments, threat frameworks, such as Mitre adversarial tactics, techniques, and common knowledge (ATT&CK), and Kill Chain, Mitre ATT&CK, may be employed to organize these adversaries and TTPs and associate detection rules to indicate coverage.

As used herein, the term "enterprise threat environment" includes a current state for the threat landscape of an enterprise as the threats to the enterprise are constantly changing.

As used herein, the term "exchange platform" includes a cloud hosted platform that allows enterprises to share logic with other enterprises. The cloud service allows enterprises to offer their logic for sharing with other enterprises.

As used herein, the term "trusted group" includes the set of enterprises that is considered trusted by the enterprise so that all of these enterprises can share logic with each other. In some embodiments, enterprises are allowed to control which logic they may choose to share with other enterprises in their trusted group.

As used herein, the term "raw event" includes machine data that is logged into a centralized system for auditing, monitoring, and review. Threat identifier use cases search through raw events to identify EOI. Also, rules detection logic will generally use raw event feeds or data models that align to logs application, endpoint, network, authentication, email, cloud data sets.

As used herein, the term "logic" includes the detection rules associated with cyber threat detection. Logic may also include context about environments and various analytics, such as usage, performance, and other meta-data, which makes the logic even more usable in the context of a SOC workflow. Logic can also include the logic for alert triage, false positive tuning, and incident response.

As used herein, the term "use case" includes a security concern or a problem that can be detected using one or more rules.

As used herein, the term "rule" or "detection rule" includes detection logic or analytical methods (e.g., Boolean, correlation, statistics, algorithms, and so forth) used to detect the activity of a use case. A use case can include one to many rules to cover the use case depending on the specifics of the respective security concern or problem.

As used herein, the term "Events of Interest" (EOI) includes detections generated from threat identifier use cases. These generally represent a combination of event(s) activity that is potentially indicative of an attack or events generated from certain attack techniques or procedures. EOI are generally high in overall volume and have a higher false positive rate.

As used herein, the term "Scenarios of Interest" (SOI) includes detections generated from threat scenario use cases. These generally include one or more EOI from threat identifier use cases. The combination of EOI activity that is included in an SOI is generally treated with higher priority because it follows a pre-defined adversary attack pattern. SOI are generally lower in overall volume and have a lower false positive rate. In some embodiments, SOI are intended to be of higher efficacy and lower volume.

As used herein, the term "threat identifier use case" include rules that generate EOI. In some embodiments, the results from threat identifier use cases are stored and labeled as EOI. In some embodiments, threat identifier use cases are categorized as signature, behavioral, baseline, or machine learning. In some embodiments, threat identifier use case categorized as signature rule logic attempt to detect confirmed/known malicious indicators to generate EOI.

In some embodiments, the results of signature rule logic are considered high confidence and can be enabled in alert mode. Examples detections from signature rule logic include Structured Query Language (SQL) injection, Anti-Virus alerts, successful traffic to known malicious domains, execution of known malware or hack tools, and so forth.

Examples detections from behavioral rule logic identifying and tracking of potential malicious behavior to generate EOI; however, typically, additional context or corresponding events are needed to confirm whether the monitored activity is a true or false positive. Generally, behavioral rule logic aligns to threat actor tactics, techniques, or procedures. Examples detections from behavioral rule logic include encoded PowerShell commands, beaconing traffic to specific domains, office files spawning additional processes, audit and policy tampering, large outbound data transfers, and so forth.

In some embodiments, baselined rule logic uses historical event activity to identify anomalous, rare, or net new EOI. Generally, baselined rule logic has a high rate of occurrence and false positive; however, it also detects certain threat artifacts or activities performed by an adversary that does not represent a specific technique, pattern, or signature.

In some embodiments, machine-learning rule logic includes algorithms or code to identify EOI based on pre-defined models (e.g., supervised or unsupervised) that can aide in detecting malicious activity.

As used herein, the term "threat scenario use case" include rules that generate SOI. In some embodiments, the results from threat scenario use case are stored and labeled as SOI. In some embodiments, threat scenario use cases are primarily responsible for combining, correlating, or finding attack patterns using one or more threat identifier use cases aligned to a specific entity(s) within an enterprise (e.g., machine or account). In some embodiments, instead of detecting individual threat identifiers, threat scenarios use cases detect multiple threat identifier use cases occurring within a specified time period that correspond to a possible attack.

In some embodiments, threat scenario use cases are categorized as sequential correlation, risk threshold, or adversary recognition. In some embodiments, sequential correlation rule logic includes time sequenced correlation of one or more events (e.g., stored in the EOI data store) to detect specific attack scenarios. Generally, sequential correlation rule logic includes Boolean correlation logic to organize event patterns over a short period of time.

In some embodiments, risk threshold rule logic processes values from determined according to a risk scoring framework to detect when entities exist on one or more events (e.g., stored in the EOI data store) to detect specific attack scenarios. Generally, risk threshold rule logic includes Boolean correlation logic to aggregate entity activity to detect above a pre-define threshold over a short period of time.

In some embodiments, adversary recognition rule logic includes pattern recognition logic to allow organizations to deploy monitoring for specific threat actor profiles that target their industry. In some embodiments, adversary recognition rule logic is based on predefined and researched adversary motivations, patterns, scenarios, techniques, and software used during compromises. Generally, these rules employ machine-learning algorithms to detect attack activity over longer periods of time.

As used herein, the term "alerting mode" includes when an enterprise or analyst wants a detected activity(ies) to be sent for triage (e.g., SIEM) or to an orchestration platform to automate incident response (e.g., SOAR).

As used herein, the term "warning mode" includes when an enterprise or analyst wants to track certain suspicious activity; however, the events are not high confidence enough to generate a response. Warnings can be used for additional correlation at a later time or can automatically turn into alerts based on increasing risk factors. Such risk factors can be set through enrichment or reference data (e.g., asset inventory, account groups, and so forth).

Content Development Platform

In some embodiments, the described content development platform integrates developing, testing, reviewing, deploying, and assessing content via a task-oriented UI experience where enterprises can develop high efficacy and high relevance alerts. In some embodiments, the platform provides a catalog of objects (e.g., threat identifier use cases, threat scenario use cases, threat identifier rules, threat scenario rules, EOI, and SOI—see FIG. 1A). These objects can be authored/developed by a platform administrator, an analyst working on behalf of an enterprise, or sharing partners.

In some embodiments, the described content development platform provides an interactive UI experience, where enterprises can create or upload their existing use cases and use standardized use cases provided by the platform or use cases shared by the community, to develop advanced use cases. Such use cases can be employed to detect threats using a plug-n-play (e.g., drag and drop) approach in the UI to define the activities and actions to detect. In some embodiments, the platform automatically starts producing the detection logic or code dynamically as the analyst interacts with the UI.

In some embodiments, the described platform provides a content framework that includes a set of core concepts and methodologies promoting, for example abstraction, modularity, and re-use in detection content. Use of the core concepts leads to generation of high efficacy, relevant alerts that can be easily triaged.

In some embodiments, the described platform allows for objects to be created, stored, searched, shared, recommended, and used as part of common enterprise content development tasks. Such tasks include, for example, new content development, customization, and deployment.

In some embodiments, the described platform provides use case types and rule categories that allow for results to be separated and stored away from normal event activity. In some embodiments, the described platform provides an abstraction layer that, when deployed in the STEM, stores and tracks events generated from different use case types and rule categories. This abstraction layer helps standardize the rule output so advanced use cases can be easily shared across industry.

In some embodiments, the described platform provides a data model and rule schema to label and organize events in, for example, a data store to be used for advanced use cases. For example, rules can be labeled using industry standards and terminology for easy adaptation across multiple enterprises (e.g., Mitre ATT&CK and Cyber Kill Chain). Rules can also be labeled by the use case type and category, for example.

In some embodiments, the described platform allows analysts to creating detection rules that align to tested and confirmed logging results generated using common adversary tactics/tools, techniques, and procedures as well as by re-creating attack scenarios, which can aide in detecting adversaries throughout the attack lifecycle.

In some embodiments, the described platform employs risk scoring to creates dynamic ratings for each rule. This risk scoring can be employed to assess the confidence and efficacy of the logic, as well as to aide in risk threshold correlation. In some embodiments, scoring is calculated based on an algorithm trained with data received from a community of enterprises as well as from results of various enterprises employing the described platform.

In some embodiments, the described platform employs a "plug-n-play" concept that allows enterprises to use content building blocks to compose a scenario use case. Employing such as plug-n-play concept allows enterprises to easily add existing detection rules to the framework as well as new feeds to specific use cases. In some embodiments, the described platform allows analysts to select a monitoring scope for some or all of their detection logic. For example, an analyst may add an asset or account groups for critical system or user monitoring. These account groups can be created, updated, or removed whenever necessary.

In some embodiments, the described platform modifies existing detection content to enhance effectiveness for the enterprise threat environment. The modification may include, for example, modifying the logic and customizing whitelists and blacklists. The modified content can be tracked by an enterprise for efficacy improvements.

In some embodiments, new detection content can be created by enterprises and deployed via the described platform to meet their unique detection needs. For example, enterprises can create threat identifier use cases and rules through the UI provided by the platform. Enterprises can also create new threat scenario use cases using existing threat identifier use cases or newly created threat identifier use cases.

In some embodiments, the described platform versions objects, such as use cases, rules, macros, whitelist, blacklists, and so forth. In some embodiments, the described platform separately tracks analytics for each version of these objects to, for example, enable an enterprise to track detection efficacy changes.

In some embodiments, the described platform includes a set of customization points that makes it easier for enterprises to adapt the content to their requirements for their environment. For example, in the Splunk STEM, macros can be used to abstract specific dependencies such as data sources and field name mappings. In such examples, an enterprise, through the described platform, can customize a macro once for their environment such that all detection content that uses the abstracted dependency (e.g., data source) will be automatically be adapted for the enterprise environment.

In some embodiments, the described platform employs an EOI data model an interface between threat identifier rules and threat scenario rules. Such an interface allows for the threat detection rules to be deployed in an alternative STEM or detection engine (e.g., Endpoint Detection and Response (EDR), Network Detection and Response(NDR), Extended Detection and Response (XDR)), and as long as the detections from those threat identifier use cases are emitted and stored in the EOI data store deployed in a SIEM, the threat scenario rule can run unchanged.

Content Framework

FIG. 1A depicts an example content framework 100 that includes the described content development platform (content platform 130). The example content framework 100 includes the content platform 130 that receives information via an enterprise feed 114 and provides detection content as well as a relevant catalog of objects, such as detection rules, to an enterprise 110. As depicted, the enterprise 110 includes an enterprise STEM/SOAR 112 through which an enterprise feed 114 is generated. The enterprise feed 114 includes existing alerts 115 and raw event data 116. The enterprise STEM/SOAR 112 also includes an enterprise logging platform 120, which includes a data stores 122 as well as events (logs) that are received from the content platform 130 are persisted. The data store 122 where events (logs) that are received from the content platform 130 are persisted. The EOI 124 and SOI 126 are each deployed as data stores in the enterprise SIEM/SOAR 112. The content platform 130 provides a content repository 140 that includes items that can be stored, versioned, shared, and developed on the platform. As depicted, the content repository 140 includes threat identified use cases 142, threat scenario use cases 144, use case supporting objects 145, and data supporting objects 146.

The example content framework 100 generally shows how the enterprise SIEM/SOAR 112 processes logs to generate alerts and provide, via the enterprise feed 114, analytics and metadata regarding these alerts to the content platform 130. Based on the data from the enterprise feed 114 as well as the series of threat identifier use cases 142 deployed at the enterprise STEM/SOAR 112, the content platform 130 determines the data models for the EOI 124 and SOI 126. The EOI 124 and the SOI 126 are deployed as data stores at the enterprise SIEM/SOAR 112 to be employed with the enterprise's 110 network for threat detection. These threat detections are stored in the EOI 124 and SOI 126 respectively.

Rules and Use Case Types

In some embodiments, the content repository 140 is a repository of core concepts that includes a catalog of objects (e.g., threat identifier use cases 142, which include respective threat identifier rules; threat scenario use cases 144, which include respective threat scenario rules; EOI data model 124; and SOI data model 126) that are tagged for search. These tags include information from various security frameworks, such as Mitre ATT&CK and Cyber Kill Chain.

The set of core detection content concepts employed by the example content framework 100 include threat identifier use cases 142 and threat scenario use cases 144. In some embodiments, the threat identifier use cases 142 include threat identifier rules that can be employed to detected specific occurrences of attacks. In some embodiments, each of the threat identifier rules include logic used to detect a specific threat identifier. In some embodiments, the threat scenario use cases 144 include threat scenario rules that can be employed to detect multiple occurrences of a threat identifiers use cases 142 within a period of time. In some embodiments, the threat scenario rules include logic used to correlate threat identifier scenarios. In some embodiments, the content platform 130 allows enterprises to define a monitoring scope for each rule when applicable. This scope can define smaller subsets of entities or assets within their environment to which a rule will apply. Examples of scope include critical system monitoring, critical user/account monitoring, and so forth.

The use case supporting objects 145 include content objects managed within the platform 130 that allow for analysts to customize use case detection content for their environment, such as the enterprise STEM/SOAR 112. In some embodiments, the use case supporting objects 145 are shared, versioned, and managed just like the threat identifier use cases 142 and threat scenario use cases 144.

As depicted, the use case supporting objects 145 include, but are not limited to, risk scoring (see below describing the risk scoring engine), scope, parse/normalize, enrichment, whitelist, blacklist, use case builder, and escalation criteria.

In some embodiments, the content platform 130 allows enterprises, such as enterprise 110, to use code that helps transform (e.g., parse, normalize) unstructured event data into structured event based on, for example, a data model. This code helps customers normalize data sets for use in advanced correlation.

In some embodiments, the content platform 130 allows for enterprises to use broad sets of enrichment metadata for better decisions within rule logic even when such data does not exist within the enterprises logging environment. Examples of enrichment data can include MITRE ATT&CK mappings, threat groups, and so forth that are associated with each rule.

In some embodiments, the content platform 130 allows enterprises to apply and manage whitelists. These whitelists can apply to a single rule or many rules within the platform. In some embodiments, whitelists include objects that track common false positive activity associated with each rule(s) to ensure that these events do not consistently trigger follow up actions when, for example, the event (or a similar event) has already been investigated and determined to be non-malicious activity. Examples of whitelists include whitelisting a specific URL (e.g., google.com) in command and control rules in a single rule set or many rules sets because the URL triggers to many alerts and is a known good website.

In some embodiments, the content platform 130 allows enterprises to manage blacklists that can apply to a single rule or many rules within the platform. In some embodiments, blacklists include objects that track already confirmed malicious activity and behaviors or indicators of compromise (IOCs), associated with a rule(s) to ensure the proper follow up actions occur when the activity is observed. Examples of blacklists include black listing IP addresses, hashes, user names, remote code execution strings, and so forth, which may be included a single rule sets or many rule sets because, for example, those events are confirmed to be malicious in nature.

In some embodiments, whitelists and blacklists are reused across rules. In some embodiments, the content platform 130 keeps track of their usage. In some embodiments, like other platform objects, the platform 130 versions whitelists and blacklists and tracks detection efficacy for each version. In some embodiments, analysts can search whitelists and blacklists by usage and efficacy via a UI provided by the platform 130.

In some embodiments, the content platform 130 allows for enterprises to create use cases through, for example, a use case builder which is an interactive wizard. In some embodiments, the use case builder allows for enterprises to create detection logic without knowing how to code. In some embodiments, the use case builder helps enterprises create complex code through a graphical interface that produces (e.g., on the backend) the code needed to detect the use case. In some embodiments, the content platform 130 allows analysts to search for use cases and customize them as necessary.

In some embodiments, the content platform 130 allows allow for enterprises to create escalation criteria for each rule. In some embodiments, escalation criteria automatically adjust rules overall risk scores when the assets, entities, or users, involved in the detected event are of high priority. Examples of escalation criteria include prioritizing event activity from rules that have a low risk score when that activity has occurred on a system, for a user, or based on a condition that the enterprise wants to prioritize.

The data supporting objects 146 include content objects managed within the platform 130 that allow for analysts to better respond to use case events (e.g., EOI 132 and SOI 134) for incident response purposes. The data supporting objects 146 provide data integrity, inventory, health monitoring, and analytics to better manage events or performance of any content object. As depicted, the data supporting objects 146 include data models, rule inventories, audit data with question and answers, health monitoring, and other analytics and metrics.

In some embodiments, the content platform 130 includes a data model(s) (or a data schema) that organizes and labels how results from, for example, threat identifiers and threat scenarios are stored in the EOI 132 and SOI respectively. This data model allows use cases to be easily shared as output is stored in a similar manner.

In some embodiments, the content platform 130 allows enterprises to manage their content through a rule inventory. In some embodiments, the rule inventory store information regarding the deployed and active use cases within an enterprise's environment.

In some embodiments, the content platform 130 provides audit logs for the activity performed on the platform 130 or within the platform's 130 corresponding on premise applications. In some embodiments, these applications allow for the enterprise to understand what changes were made and when.

In some embodiments, the content platform 130 provides notifications to inform enterprises when, for example, an object within the platform 130 is not operating as expected or when data being ingested into the abstraction layer changes in a matter that cases downstream impacts. In some embodiments, the platform 130 provides procedures that allow for enterprises to automatically correct these layer changes or automatically re-run any use cases that were broken during downtime. In some embodiments, these notifications are tied to specific version of the use cases and rules by the platform 130. In some embodiments, these notifications allow analysts to track efficacy across versions.

In some embodiments, the content platform 130 provides a visualization and reporting/metrics dashboard that allow for the enterprises to better visualize, triage, and gather metrics around the activity that is being detected (e.g., per use case). These dashboards also provide for the management of objects, visualizations for the health of the system, and so forth.

Data Abstraction Types

In some embodiments, two data abstractions, EOI 124 and SOI 126, are used to tie together the threat identifier rules and threat scenario rules respectively. In some embodiments, the results from the threat identifier detection rules are abstracted as EOI 124, which are persisted to the data store 122. In some embodiments, the results from the threat scenario detection rules are abstracted as SOI 126, which are persisted to the data store 122. In some embodiments, the data models for the data store 122 are defined and managed in the platform 130 and the data store 122 is are deployed in the enterprise SIEM 112.

Data Repository

In some embodiments, the data store 122 includes a repository of data stores. In some embodiments, the repository of data stores includes a catalog of objects such as described above. These objects may be in deployed at the Enterprise's STEM 112. In some embodiments, metadata associated with these data stores indicates which EOI 124 are stored in each data sores. The data stores 122 are searchable and can be employed to generate recommendations regarding which data store 122 is appropriate for a particular use case. In some embodiments, the data stores 122 can be deployed across more than one STEM instance or detection engines such as EDR, NDR, XDR. In some embodiments, the data store 122 includes additional concepts that are available for use in detection rules. Example additional concepts include whitelists, enrichment data sources (internal or external), risk scoring, monitoring groups, and asset data including hosts and users.

Support Tasks

In some embodiments, the content platform 130 offers UI workflows for searching use cases (e.g., threat identifier use cases 142 and threat scenario use cases 144) and rules, and defining new use cases by, for example, composing or customizing existing use cases. In some embodiments, the content platform 130 offers testing opportunities for each rule an analyst wants to deploy. In some embodiments, analysts can automatically or manually execute detection content in their environment to determine effectiveness and efficacy within their enterprise. In some embodiments, the content platform 130 provides a review process for new content so enterprise can, for example, assign internal reviewers to ensure applicability before deployment in the enterprise's 110 environment. In some embodiments, the content platform 130 provides functionality for the enterprise 110 to share new content with administrators of the content platform 130, members of a trusted enterprise group, or the entire community.

In some embodiments, threat scenario use cases 144 within the content platform 130 comprise a sequence of threat identifier use cases 142. In some embodiments, the content platform 130 allows an analyst to step through each of the threat identifier use cases 142 in a deployed version of a scenario in order to verify that the scenario is working as expected. In some embodiments, the content platform 130 deploys rules directly to the Enterprise's SIEM 112 by, for example, deploying the associated rules, data abstractions, data objects, models, and schema. In some embodiments, rules can also be deployed on a case by case basis without deploying associated objects and schemas. In some embodiments, alert notifications are not tied to a specific STEM or appliance. In some embodiments, notifications can be sent as customized.

In some embodiments, the content platform 130 integrates with the on-prem STEM, such as depicted in FIG. 1A, to keep track of which use cases and constituent rules are deployed. In some embodiments, the content platform 130 receives telemetry regarding efficacy and performance of the deployed use cases and respective rules from the Enterprise 110. In some embodiments, the content platform 130 presents these analytics according to use case to guide the analyst for future use, while also identifying potential coverage gaps that exist in the analyst's monitoring environment.

In some embodiments, the content platform 130 can help assess the health of a monitoring environment by notifying the associated analyst(s) when rules are not running efficiently, or if rules are generating errors indicating rules are not operating as expected. In some embodiments, the content platform 130 identifies logging or pattern changes that may break previously defined rules. In some embodiments, the content platform 130 notifies production support groups within the enterprise when these incidents occur (e.g., when requested by an analyst).

In some embodiments, the content platform 130 allows analyst to manually or automatically re-run rules during a specified time range when, for example, the Enterprise's SIEM environment 112 has dealt with a production incident that caused rules to break or not operate as expected.

Solutions Architecture & Concepts

In some embodiments, the content platform 130 organizes detection rules into multiple types or categories to assist users with detecting security use cases. In some embodiments, the generated output from a detection rule is labeled and persisted to data store based on a schema that enables the creation of high efficacy detections. In some embodiments, detection rules are organized into two different types of uses cases: (1) threat identifier use cases 142 and (2) threat scenario use cases 144. In some embodiments, threat identifier rules are employed to generate EOI 124 for a respective threat identifier use case 132, while threat scenario rules are employed to generate SOI 126 for a respective threat scenario use case 120.

Threat Identifier Use Cases

In some embodiments and as depicted in FIG. 1A, each threat identifier use case 132 includes categorizations (signature, behavioral, baseline, or machine learning) of the types of threat identifier rules that are used/executed to fulfil the use case. In some embodiments, additional categories can be added as the threat landscape evolves or as needed. In general, detection logic or threat rules, corresponding to a threat identifier use case 132 use raw events 116 that are processed from, for example, event logs (e.g., security logs) or pre-defined customer data models, to detect activity. Examples security log types include application, endpoint, network, web, authentication, email, and cloud logs.

In some embodiments, the threat identifier rules associated with a threat identifier use case 132 detect specific occurrences of: (1) known malicious activity that aligns to specific indicators of compromise; (2) potentially suspicious activity that aligns to adversary behaviors such as their tactics, techniques or procedures; (3) anomalous or abnormal activity that rarely occurs or has never occurred before; and (4) suspicious activity, patterns, or classifications from supervised or unsupervised machine learning algorithms. These such events do not follow a specific attack pattern or scenario, but merely generate activity that could be indicative of an attack with limited correlation between them.

In some embodiments, results of threat identifier use cases 142 are persisted in a separate data store (e.g., the abstraction layer) labeled as EOI 124. In some embodiments, each of the threat identifier rules associated with a threat identifier use case 132 has a risk score that is determined based on multiple factors (see below).

Threat Identifier Risk Scoring Engine

In some embodiments, a risk scoring engine (not shown) is employed by the content platform 130 to set a unique score (e.g., numerical 1-10) to each threat identifier rule associated with a respective threat identifier use cases 142. These risk scores, which are use case supporting object 135, can then be used by threat scenario use cases 142 that generate SOI 126 when an entity (e.g., user, machine, server) occurs in multiple threat identifiers during a specific period over a pre-defined threshold. The risk score for each rule may be regularly updated through inputs from the content platform 130 (e.g., customer or community-based inputs) and from threat identifier rule metadata (e.g., count of occurrence, analyst comments, and so forth). In some embodiments, generally, lower scores are assigned to rules that are lower in confidence that may generate a high volume of events with higher false positive rates, while higher scores are assigned to rules that are higher in confidence and may generate a low volume of events with higher true positive rates.

Monitoring Modes

Figure 1B:
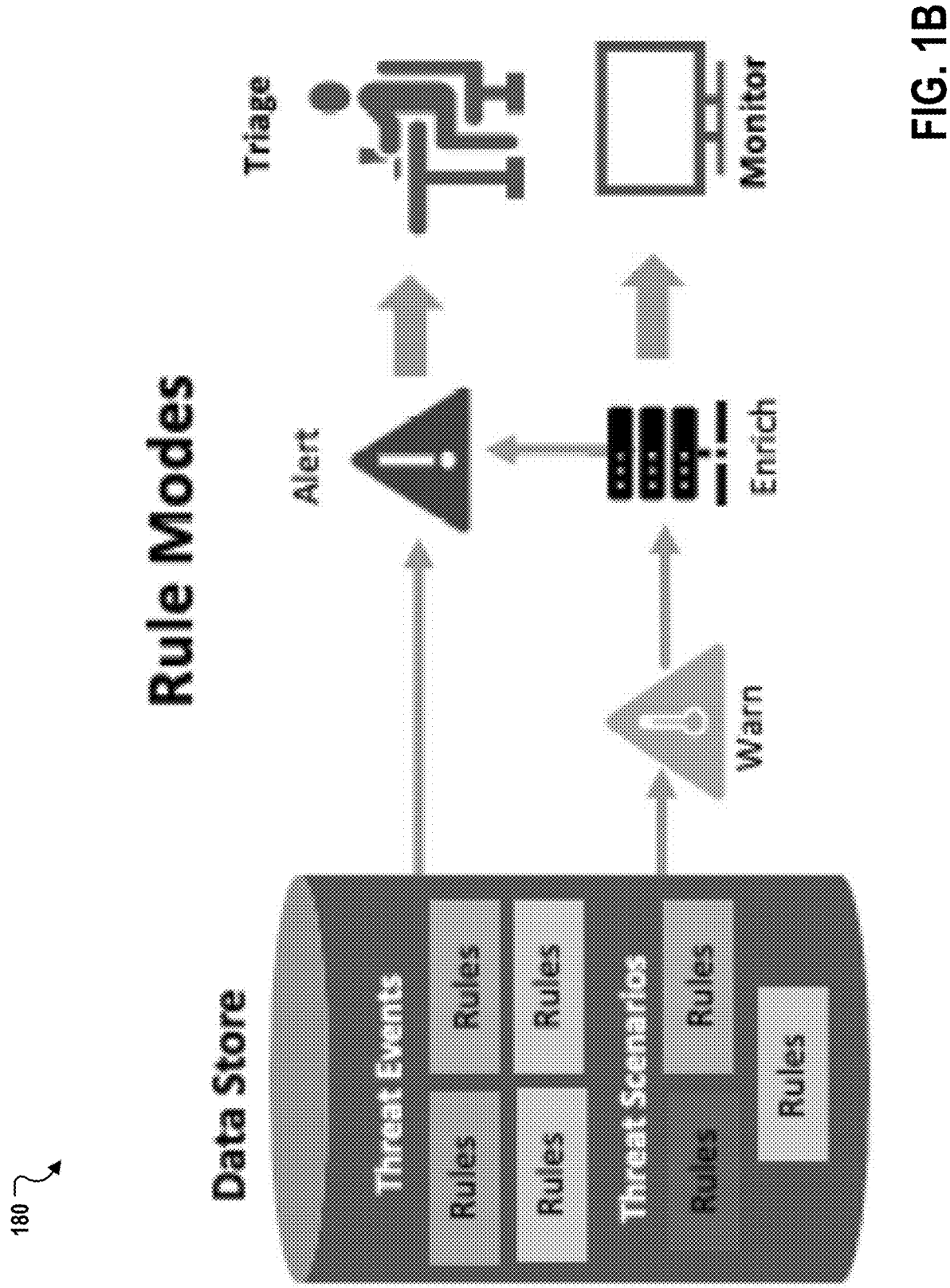

In some embodiments, each enterprise can configure the threat identifier rules and threat scenario rules employed within the enterprise in two modes: alert and warn. FIG. 1B depicts an example framework 180 employing these two modes. In some embodiments, alert mode is used when an enterprise wants the activity detected by a rule to be sent to an analyst to triage (e.g., SIEM) or to an orchestration platform to automate incident response (e.g., SOAR). In some embodiments, warn mode is used for tracking suspicious activity; however, the tracked events are not high confidence enough to generate a response. In some embodiments, warn mode can be used for additional correlation later or can automatically switch to alert mode based on increasing risk factors set by the enterprise through, for example, enrichment or reference data (e.g., asset inventory, account groups, and so forth).

Analyst Options

In some embodiments, analysts may employ the content platform 130 to build, manage, and deploy rules. In some embodiments, the content platform 130 provides access to pre-built, high quality threat identifier and threat scenario use cases, which include rules across multiple categories. In some embodiments, analysts may create, modify, or add their own rules following a specified format. For example, threat scenario rules may be created through a virtual wizard, where analysis can select (e.g., drag and drop) the threat identifiers that they want to use to detect an attack scenario. In addition, the content platform 130 provides an option to define a monitoring scope for use cases by, for example, filtering logic to apply to only assets or accounts of interest (e.g., critical system monitoring, critical user monitoring, and so forth).

In some embodiments, once relevant conditions (e.g., schedules, time frames, scope, mode, and so forth) are set, the use cases can be manually or automatically deployed for monitoring purposes. In some embodiments, a monitoring mode can be selected during deployment. In some embodiments, a selected monitoring mode apply to each rule within the content platform 130 and can be updated at any time. In some embodiments, two monitoring modes can be set for each rule: (1) Alert and (2) Warn. In some embodiments, monitoring modes can apply to rules in both threat identifier and threat scenario use cases.

Generally, most threat identifier rules are set in warning mode, while most threat scenario rules are set in alert mode. In some embodiments, alerting mode is employed to detected activity to be sent to an analyst to triage (e.g., SIEM) or to an orchestration content platform 130 to automate incident response (e.g., SOAR). In some embodiments, warning mode is employed for tracking certain activity where the events are not high confidence enough to generate a response. Warnings may also be used for additional correlation (e.g., at a later time) or to automatically convert into alerts based on increasing risk factors set by the analysist.

FIGS. 2A-2E depict examples of how threat identifier use cases 142 can be used to correlate events based on, for example, an attack scenario used to trigger an alert for a SOC analyst to triage. FIGS. 2A-2E and the below description show how the described platform can be employed to detect malicious activity, produce a timeline of the events, and help analysts understand how far an attacker was able to go. FIGS. 2A-2E also show content framework objects and the rules associated with use cases that are deployed at an enterprise SIEM that operates, for example, on feeds and populates the EOI and SOI data stores, which may also be deployed at the SIEM.

Example Detection Scenario

Figure 2A:
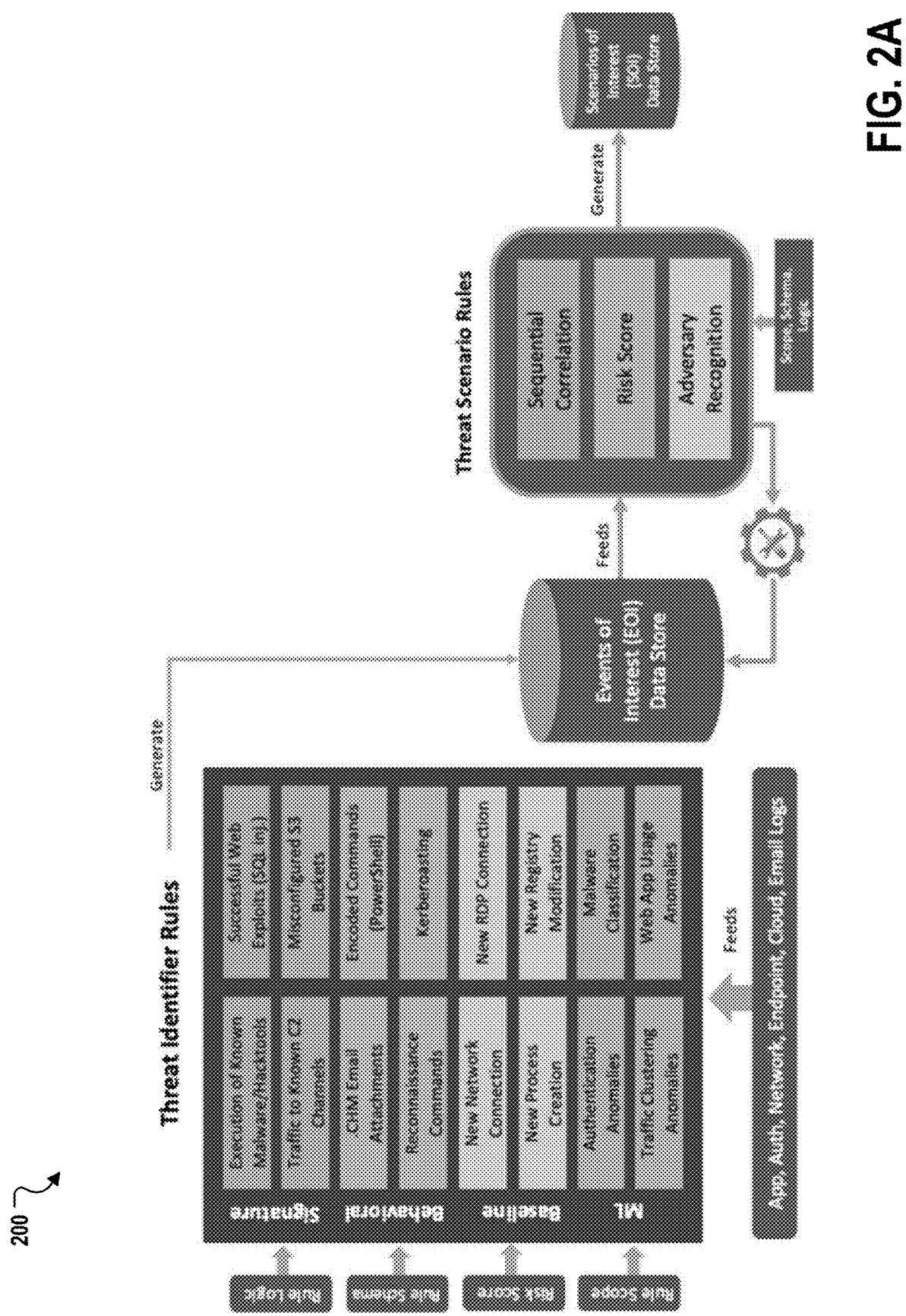

FIG. 2A depicts an example monitoring framework 200 with use case examples. As an example, a detection scenario includes identifying an employee opening a malicious email attachment and successfully installing malware using PowerShell to execute lateral movement activities. The example detection scenario creates a timeline of event activity and attempt to understand how far the attacker was able to get and determines whether actions on objectives were performed.

Continuing with the example, an attacker performs the following activities in order: 1) victim opens an Excel attachment that contains a malicious macro on their machine called "Anvilogic", 2) the macro drops a malicious PowerShell script that executes an encoded command on victim's machine 3) the script makes registry modifications for persistence on victim's machine, 4) the script initiates Command and Control channel between the attacker and the victim, 5) the attacker begins internal reconnaissance activity, 6) the attacker conducts Kerberoasting technique from the victim's machine to obtain credentials to crack, 7) the cracked credentials are used to move laterally to other machines over the Remote Desktop Protocol (RDP) protocol from the victim's machine.

Continuing with the example, the threat identifier rules included in the below Table 1.1 are deployed in the victim's environment. These rules detect specific activity and are scheduled to run at a regular interval and results are stored into the basic EOI data store for correlation.

TABLE 1.1

| # | Threat Identifier Use Case Name | Category | Kill Chain Phase | ATT&CK Tactics & Techniques | Risk Score |
|---|---|---|---|---|---|
| 1 | Execution of known malware/hack tools | Signature | Installation | Execution: Multiple techniques | 9 |
| 2 | Successful Web Exploits (e.g., SQL injection) | Signature | Exploitation | Initial Access: Exploit Public-Facing Application | 8 |
| 3 | Traffic to known command and control (C2) Channels | Signature | C2 | C2: Commonly Used Port | 7 |
| 4 | Misconfigured Simple Storage Service (S3) Buckets | Signature | Actions on Objectives | Collection: Data from Cloud Storage Object | 8 |
| 5 | Office Apps Spawning Executables | Behavioral | Delivery | Execution: User Execution | 5 |
| 6 | Encoded PowerShell commands | Behavioral | Installation | Execution: PowerShell | 6 |
| 7 | Reconnaissance Commands | Behavioral | Actions on Objectives | Discovery: Account, File & Directory, System Information, Remote System, System Network Connections Discovery, System Owner/User Discovery | 2 |
| 8 | Kerberoasting Activity | Behavioral | Actions on Objectives | Credential Access: Kerberoasting | 8 |
| 9 | New Network Connection | Baseline | C2 | C2: Commonly Used Port, Fallback Channels | 2 |
| 10 | New Established Connection over RDP | Baseline | Actions on Objectives | Lateral Movement: Remote Desktop Protocol | 1 |
| 11 | New Process Creation | Baseline | Installation | Execution: Service Execution | 3 |
| 12 | New Registry Modification | Baseline | Installation | Persistence: Registry Run Keys/Start Up | 7 |
| 13 | Traffic Clustering Anomalies | Machine Learning | C2 | C2: Commonly Used Port | 2 |
| 14 | Malicious Email Classification | Machine Learning | Delivery | Initial Access: Spearphishing Attachment, Spearphishing Link | 6 |

Figure 2B:
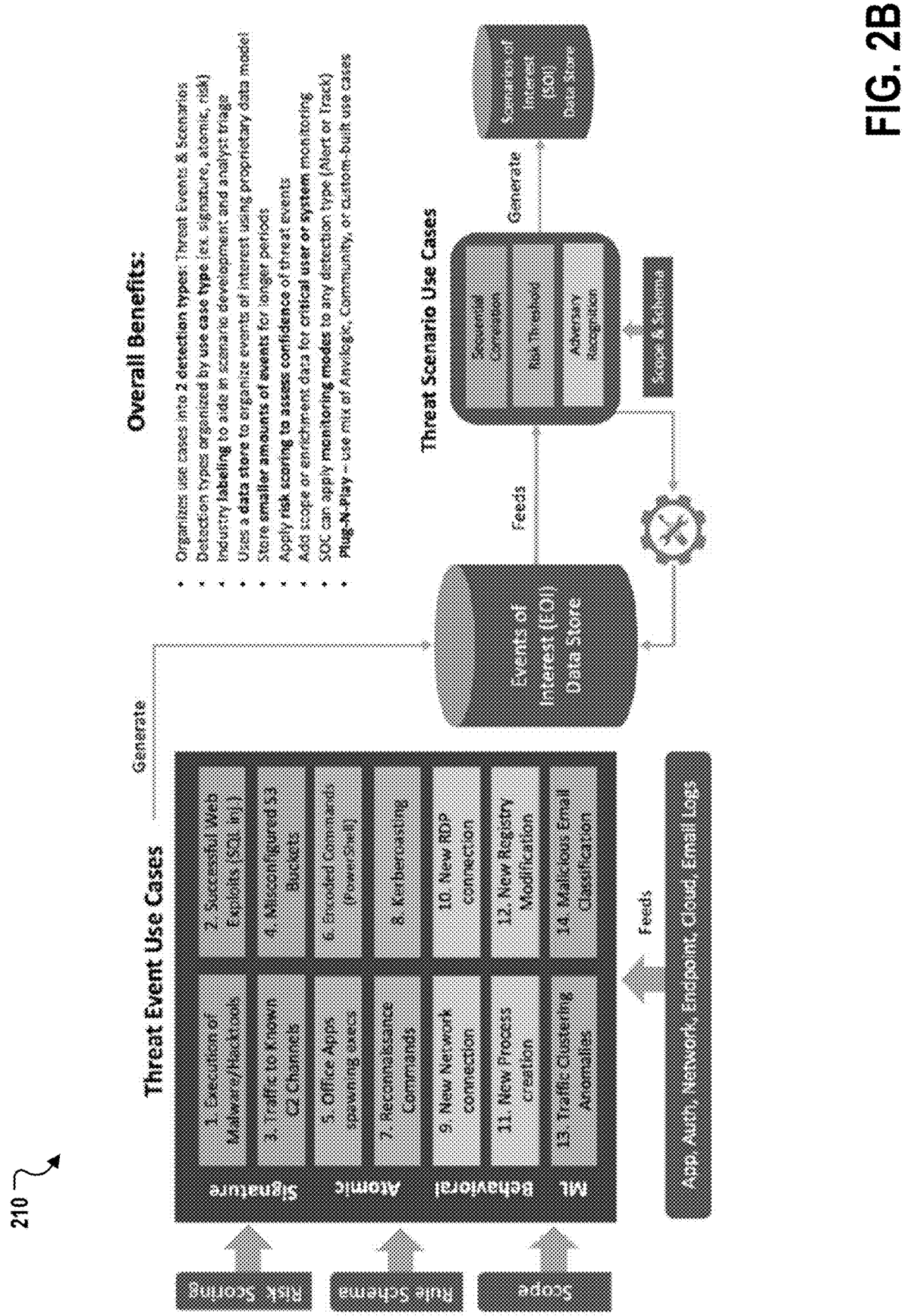

FIG. 2B depicts an example of a monitoring framework 210 with the use cases (1-14) described in the above Table 1.1 enabled.

Threat Scenario Builder

In some embodiments, through the described platform, analysts can select use cases to detect a threat scenario(s). In some embodiments, an analysist selects any of the enabled use cases and provides a sequence and time frame for the detection logic. In some embodiments, the platform provides Cyber Kill Chain and MITRE ATT&CK labeling to assist the analyst in selecting use cases for a specific threat.

In some embodiments, threat scenario use cases are categorized. For examples, threat scenario use cases may be categorized as advanced correlation, risk threshold, or pattern recognition. In some embodiments, a mode is associated with each threat scenario rule. Such a mode can be used to determine a next action when an activity occurs. In some embodiments, two modes, alert and warning, are used (see FIG. 1B). In some embodiments, results from threat scenario rules are logged as SOI.

Threat Scenario—Sequential Correlation Example

As an example, to create a threat scenario sequential correlation rule, an analyst may perform the following:
1. Select a triggering event that represents the beginning of a compromise/attack scenario. In some embodiments, analysts have the option to sort threat scenario use cases by multiple labels, such as Kill Chain Phases, ATT&CK framework, use case type, and so forth. In some embodiments, analysts can select use case by the rule names. The following is an example of a selected event organize by Cyber Kill Chain: "The triggering event should be the execution of the excel file that runs a malicious macro." (corresponds to use case 5: Office Apps Spawning Execs from Table 1.1).

2. Select the threat identifier rule(s) that would likely occur next in the compromise/attack scenario. For example, use cases used: 6: Encoded PowerShell Command, 12: New Registry Entry, and 9: New Network Connection (see Table 1.1).

3. Apply filtering or scoping criteria for critical systems or accounts.

4. Select a scenario timeframe and sequence between each use case to scope and outline how long it would take in between each technique to fine tune the correlation logic. For example, sequencing used (these occur in order): (1) Office Apps Spawning Execs, (2) Encoded Commands (PowerShell), (3) New Registry Modification, (4) New Network Connection; and time frames used: 1, 2, and 3 each will occur in order within 1 minute, 3 and 4 will occur in order within 30 seconds, and all four use cases (1-4) will occur in order within 2 minutes FIG. 2C depicts a representation 220 aligned to the Cyber Kill Chain for the monitoring framework provided through the described platform.

Threat Scenario—Risk Score Example

Using the above scenario, in some embodiments, the risk thresholding rule operate to provide analysts with multiple options for selecting how to apply risk scoring to generate SOI. For example, a risk threshold may be set to ten within 24 hours. Such a configuration provides that when an asset is part of one or more threat identifier or threat scenario use cases that total more than ten within a 24-hour period, the activity is logged as a scenario event of interest that can be, for example, used for monitoring.

Threat Scenario Risk Threshold Rule Example

Figure 2D:
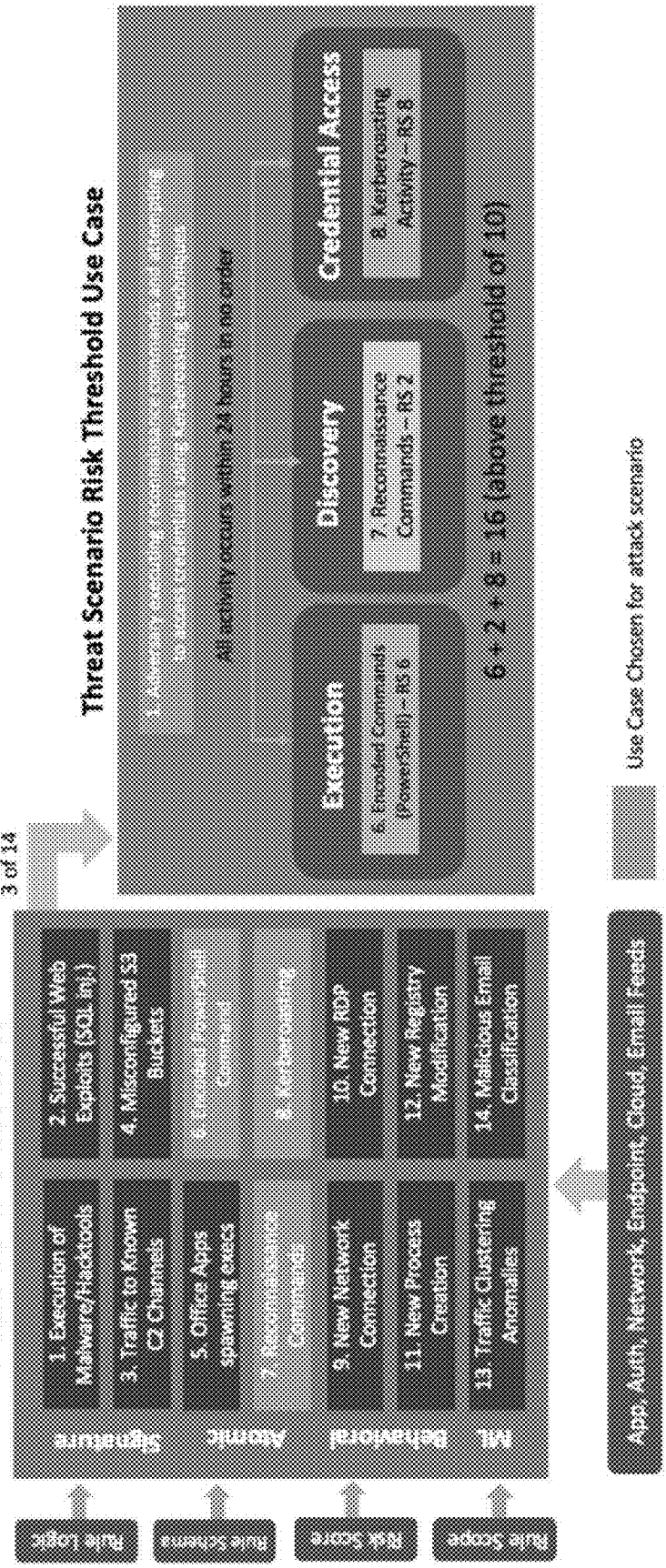

FIG. 2D depicts a representation 240 using MITRE ATT&CK for the monitoring framework provided through the described platform. As an example, an analysist may perform the following to create a threat scenario risk threshold rule:
1. Select a threat identifiers rule(s) to include within risk scoring logic. In some embodiments, the selected threat identifier rules do not have to occur in any particular order or sequence. In some embodiments, analysts are provided the option to sort by, for example, multiple labels such as Kill Chain Phases, ATT&CK framework, use case type, and so forth. In some embodiments, analysts may select rules based on rule names. For this example, three rules are selected 6: Encoded PowerShell Commands, 7: Reconnaissance Commands, and 8: Kerberoasting Activity (see Table 1.1), and organized by the ATT&CK framework.
2. Apply filtering or scoping criteria for critical systems or accounts.
3. Set a rule risk threshold number, timeframe, and entity (either machine or account). For example, A threshold variable is set to ten, a timeframe variable is set to 24 hours, and an entity variable is set to "End User Machine."

Threat Scenario—Adversary Recognition Example

Figure 2E:
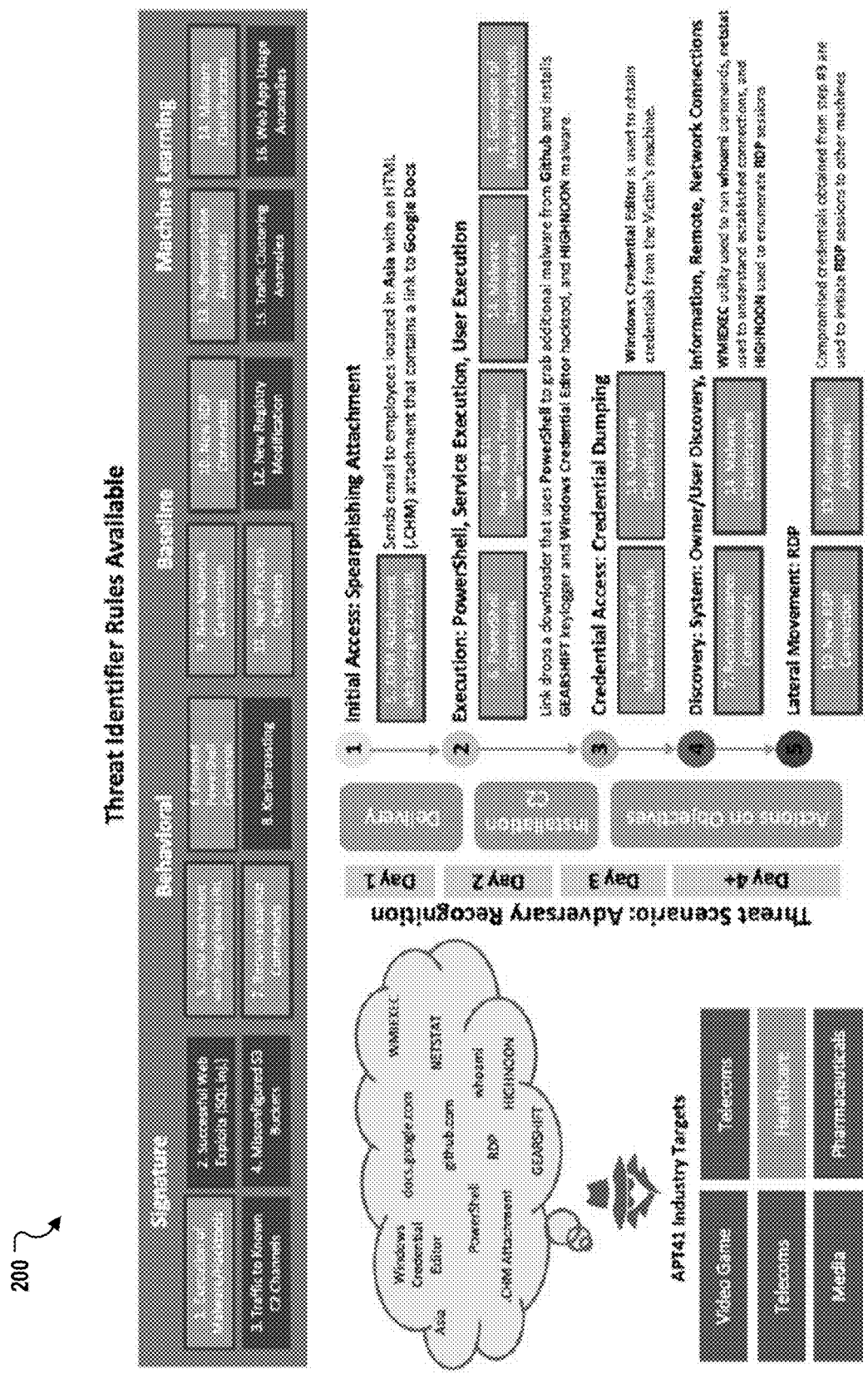

In some embodiments, machine learning models trained with TTPs data used by threat actors is employed by the describe platform to aide in pattern recognition. Enterprises can deploy these recognition detections through the described platform to monitoring for specific adversaries that target their industry. As an example, APT41 is a group that carries out state-sponsored espionage activity in addition to financially motivated activity. APT41 has been active since as early as 2012 and has been observed targeting healthcare, telecom, technology, and video game industries in 14 countries. According to TTPs from attached conducted by APT41, the threat identifier rules highlighted in FIG. 2E are known to have been used. Thus, as depicted in FIG. 2E, the described platform can be employed to detected APT41 activity based on identified pattern or relationship within the analysist's environment.

FIG. 2E depicts an example scenario 250. The example scenario 250 depicted in FIG. 2E show how the monitoring framework provided through the described platform can be employed to detect APT41 activity. As depicted, the example scenario 250 includes:
1.) Spear phishing emails being delivered to employees in Asia with HTML attachments that contains links to malicious google docs drive to deliver a downloader.
2.) User clicks on the attachment and downloads the malicious downloader, which uses PowerShell to reach out to Github to install 3 other malware variants (GEARSHIFT, Windows Credential Editor, and HIGHNOON).
3.) After command and control is established, windows credential editor is used to compromise credentials on the victim's machine.
4.) Attacker begins internal reconnaissance activity using, for example, WMIEXEC utility running commands such as "whoami" and "netstat" to understand user and connection information, and HIGHNOON to enumerate RDP sessions.
5.) Compromised credentials are used to begin lateral movement activities using the RDP.
All capitalized activity represents attributes that can attempt to attribute the activity to APT41.
Options for Deployment:

In some embodiments, use case options provided through the described platform include: enabling rules per use case type; creating rules; integrating existing rules/logic that are deployed; creating custom threat scenario correlation rules based on active threat identifier rules; selecting threat scenario correlation rules from pre-built advanced correlations; defining a monitoring scope (e.g., filtering based on critical asset or user groups); updating groups using a static list or through a custom dynamic job; specifying monitoring group duration; determining to update a monitoring group; using a risk scoring engine (see FIG. 1A) provided through the system or a custom risk scoring engine; enriching a threat scenario use case with internal reference data (e.g., asset inventory database, account inventory database, and so forth); using external API resources (e.g., Virus Total®, IP Whois®, and so forth.); using enrichment APIs; adding or generating white listing options per rule(s); generating local whitelists that filter out, for example, analysist specific behavior (baseline rules); defining retention policies for observed activity; which can be used to generate the new occurrences; modifying conditional logic within a rule(s) to better adhere to an environment; selecting a monitoring mode (e.g., alert or warn) for each rule under the primary use case types (e.g., threat identifiers and threat scenarios); adding an escalation criterion to rules in warn mode to, for example, automatically turn the warning into an alert.

In some embodiments, platform options include: search, collaborate, share, recommend, and provide ratings for content. In some embodiments, analysts can leverage the platform to replace a content development process, which may include: content development standards, rule testing, rule documentation, rule versioning control, review and approval processes for new content. In some embodiments, along with changes and decommissioning, analysts can provide information for monitoring form or deploy a feed discovery script to receive rule recommendation. In some embodiments, the described platform can be deployed/accessed via an on-premise application or by downloading specific components (e.g., via an API). In some embodiments, rules to feeds and data models can be aligned through the platform. In some embodiments, alerts can be sent to a SIEM, an orchestration platform, or an appliance, via the described platform. In some embodiments, the health of the monitoring framework provided through the described platform can be monitored with provided error and reporting logic. In some embodiments, a rule re-run engine can be employed to re-execute rules that failed to run as expected. In some embodiments, the platform provides notifications when jobs fail. In some embodiments, the frequency of rule execution can be set via the described platform. In some embodiments, the platform allows for changes to criteria at any time, without having to re-deploy or update rules. In some embodiments, the platform provides a kill switch that disables rules during platform incidents.

Figure 3:
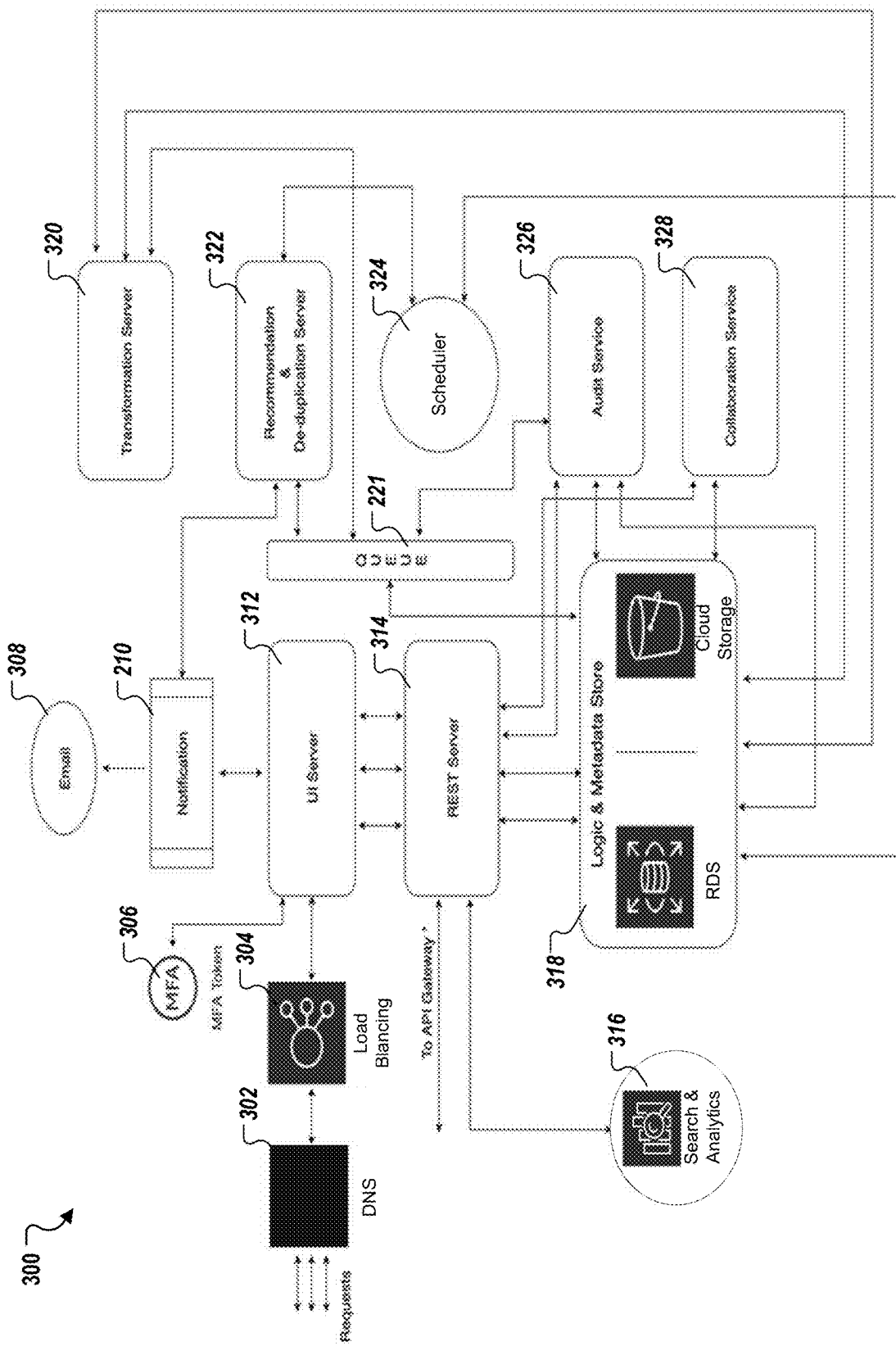
FIG. 3 depicts a non-limiting example architecture of the described platform.

FIG. 3 depicts an example architecture 300 for the described platform. As depicted, the example architecture 300 includes domain name system (DNS) service 302, load balancing service 304, notification module 310, UI server 312, representational state transfer (REST) server 314, search and analytics service 316, logic and metadata store 318, transformation server 320, recommendation and de-duplication server 322, scheduler 324, audit service 326, and collaboration service 328. The example architecture may be deployed through a computing environment, such as the example environments described in FIG. 7. The various servers, modules, and data stores, of the architecture 300 may be deployed through dedicated or virtual devices, such as described in FIG. 7. The various servers, modules, and data stores, of the architecture 300 may be deployed using cloud computing resources.

In some embodiments, the DNS service 302 resolves, or translates addresses (e.g., IP addresses) as requested and communicates with other DNS services via web-based protocols. Example DNS services that may be employed within example architecture 300 include Amazon™ Route 53.

In some embodiments, the load balancing service 304 distributing incoming network traffic across a group of backend servers. Example load balancing services that may be employed within example architecture 300 include Elastic™ Load Balancing Service.

In some embodiments, the notification module 310 provides communication, such as email 308, to users of the described platform. For example, the notification module 310 may provide a communication to security administrator that is accessible through a user device. Such user devices can include any appropriate type of computing device. Computing devices are described in greater detail below in the section describing the computing devices 702, 704, and 706 depicted in FIG. 7.

In some embodiments, the UI server provides a UI to user device such as described above. The provide US may include, for example, web pages viewable with a browser application. FIGS. 4A-4D (described below) depict example pages for a UI that can be provided by the described platform.

In some embodiments, users may provide credentials, such a username and password, that can be authenticated to access the UI. In some embodiments, multi-factor authentication (MFA) through an MFA token 306 may be employed to authenticate users. Other types of authorization and user verification may also be employed by the described platform.

In some embodiments, the REST server 314 is employed to provide requests and responses, to the various clients accessing the system, built around the transfer of representations of resources (e.g., the services provided through server and services 320-328).

In some embodiments, the search and analytics service 316 stores, searches, and analyzes big volumes of data quickly and in near real-time. Example search and analytics services that may be employed within example architecture 300 include Elasticsearch™. For example, the Elasticsearch service may be employed to provide search for the logic and content in the system.

In some embodiments, the logic and metadata store 318 are employed to store information. In some embodiments, the logic and metadata store 318 include relational database services (RDS), such as Amazon RDS. In some embodiments, the logic and metadata store 318 include cloud-based storage, such as Amazon S3. Data stores are described in greater detail below in the data store section.

In some embodiments, the scheduler 324 controlling unattended background program execution of job. Example schedulers that may be employed within example architecture 300 include Quartz™.

In some embodiments, the UI server 312 communicates to the REST sever 314 for requests from a user device (e.g., through a browser application). For example, a user may be presented, though a user device, a login screen. The user may authenticate via MFA via an MFA token 306. Upon successful login, a user will be entitled to, for example, view the information persisted to the logic and metadata store 318 through the provide UI. In some embodiments, the UI Server 312 communicates with the notification service 310 for configuring notifications, such as email 308, as per users' preference. In some embodiments, the REST Server 314 handles requests from the UI Server 312 and the other interfaces as well as requests from an API gateway (e.g., Amazon™ API Gateway). In some embodiments, requests flowing through REST are in JavaScript Object Notation (JSON) format. In some embodiments, there is a protocol contract between the REST and different modules, such as the transformation server 320, the recommendation and de-duplication server 322, the audit service 326, and the collaboration service 328.

In some embodiments, the transformation server 320 picks up uploaded logic from a queue 321 and converts them into specific formats and adds metadata for the logic. In some embodiments, the recommendation and deduplication server 322 retrieves transformed logic from the queue 321 and assigns recommendation weights for the logic. In some embodiments, the recommendation and deduplication server 322 performs de-duplication of logic to avoid multiple logics for the same solution. In some embodiments, the recommendation and deduplication server 322 is run periodically as scheduled by the scheduler 324.

In some embodiments, the audit service 326 tracks actions performed by users. In some embodiments, records generated by the audit service 326 are stored in the logic and metadata store 318. In some embodiments, these records are stored for a configurable amount of time after they may be download by, for example, an administrator.

In some embodiments, the collaboration service 328 exchanges logic between various users of the described platform.

In some embodiments, the recommendation and de-duplication server 322 processes the collected incident report data to determined enriched logic, which may include detection rules, to provide to various enterprises based on provide criteria. For example, an enterprise may provide information regarding its size, location, and vertical to the recommendation and de-duplication server 322, which determines a set of detection rules based on the criteria. In some embodiments, the recommendation and de-duplication server 322 processes the provided criteria through a machine-learning model to determine a set of detection rules.

Example User Interface Pages

FIGS. 4A-4D depict various example pages provide by the described platform via, for example, the UI server 312.

Figure 4A:
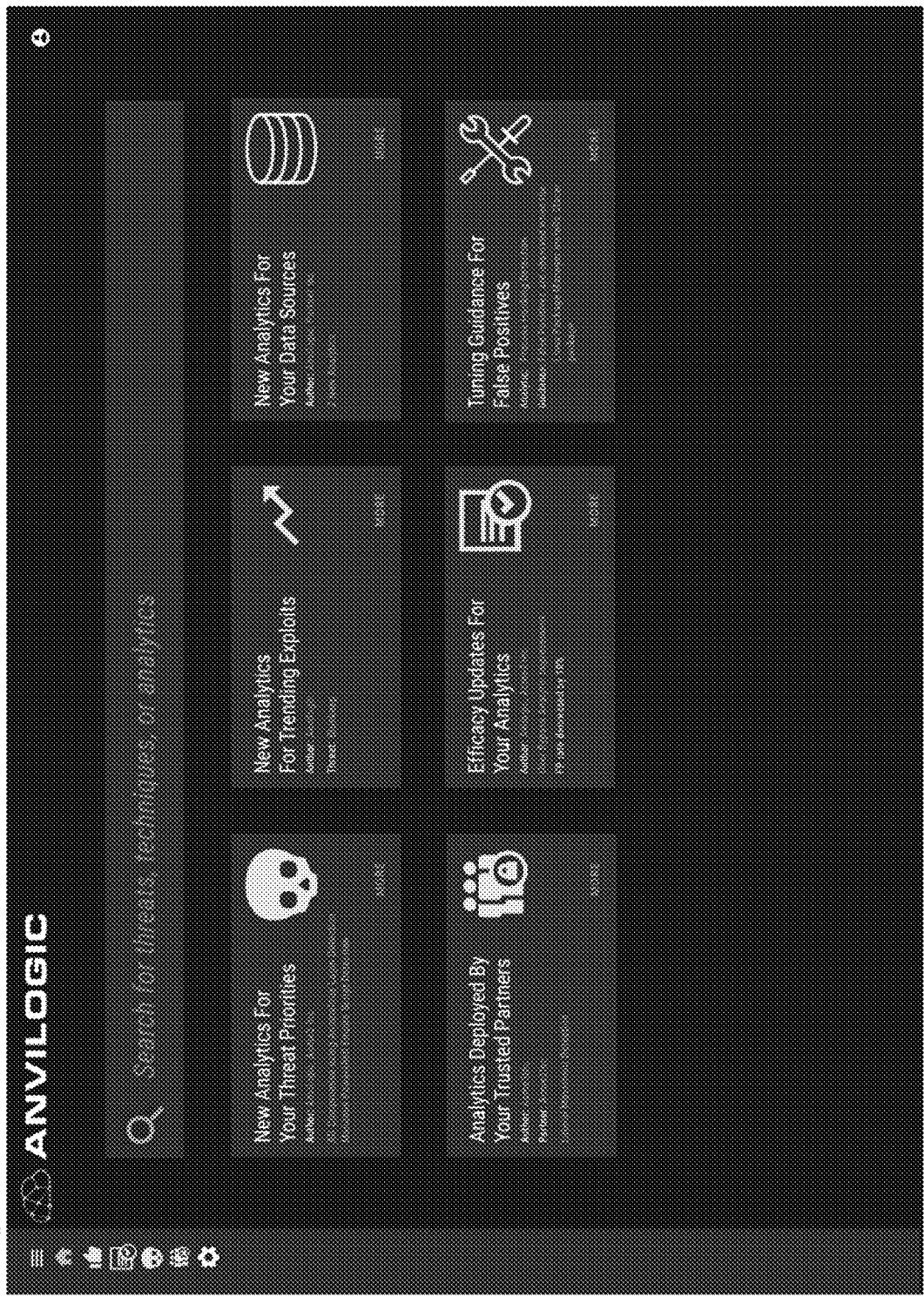
FIGS. 4A-4D depict various non-limiting example pages of a UI by the described platform.

FIG. 4A depicts an example home page 400 for the described platform. The example home page 400 can be employed to provided, for example, detection rules determined based on the criteria provided by the enterprises (e.g., security administration) or based on general information the system. In some embodiments, the home page 400 may also recommend detection rules based on observed context and relevance. In some embodiments, home page 400 may recommend relevant updates made to existing detection rules or new detection rules employed by trusted enterprises.

Figure 4B:
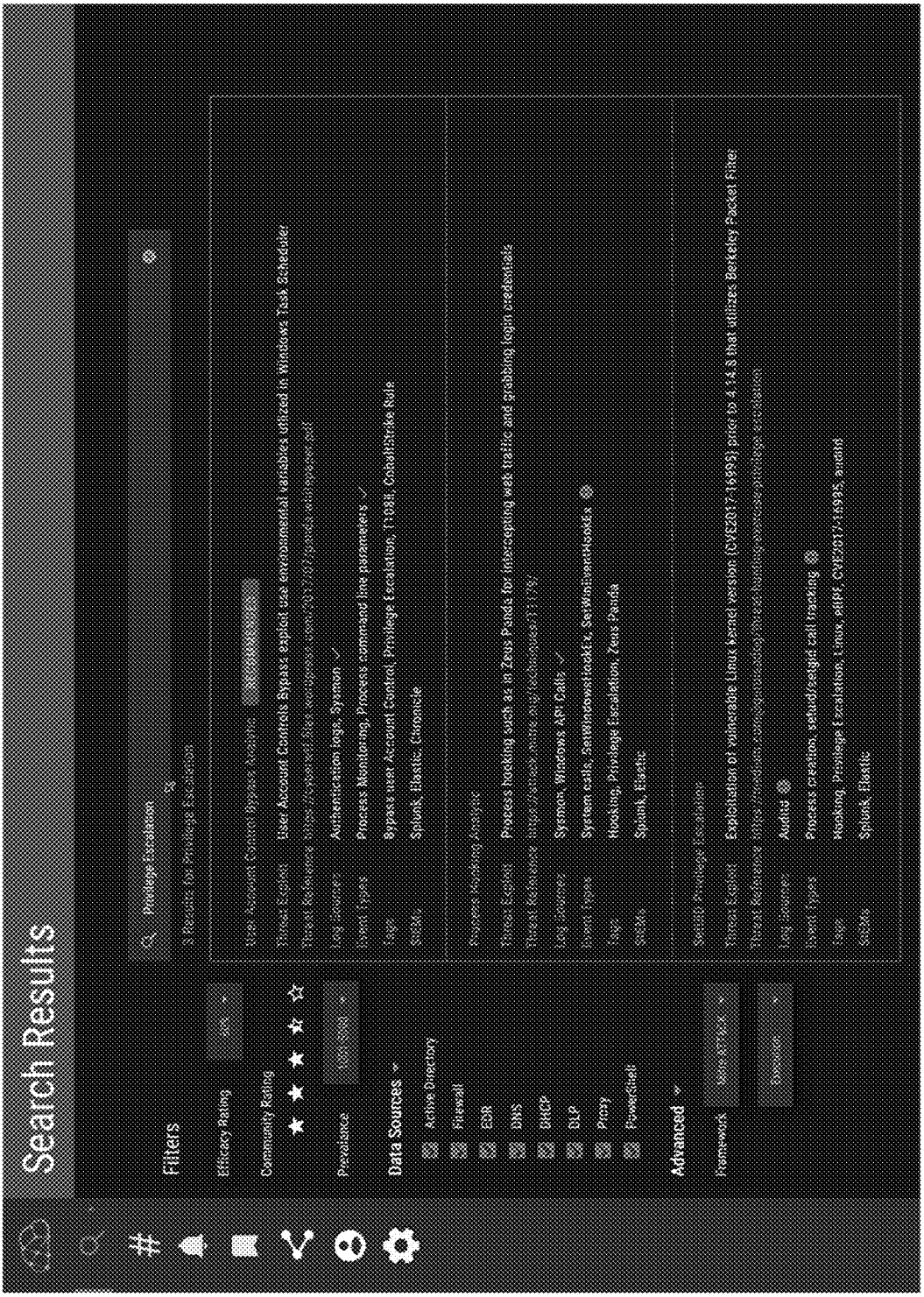

FIG. 4B depicts an example search results 410 for the described platform. The example usage page 410 provides search information regarding various threats, incidents, detection rules, triage employed, and so forth.

Figure 4C:
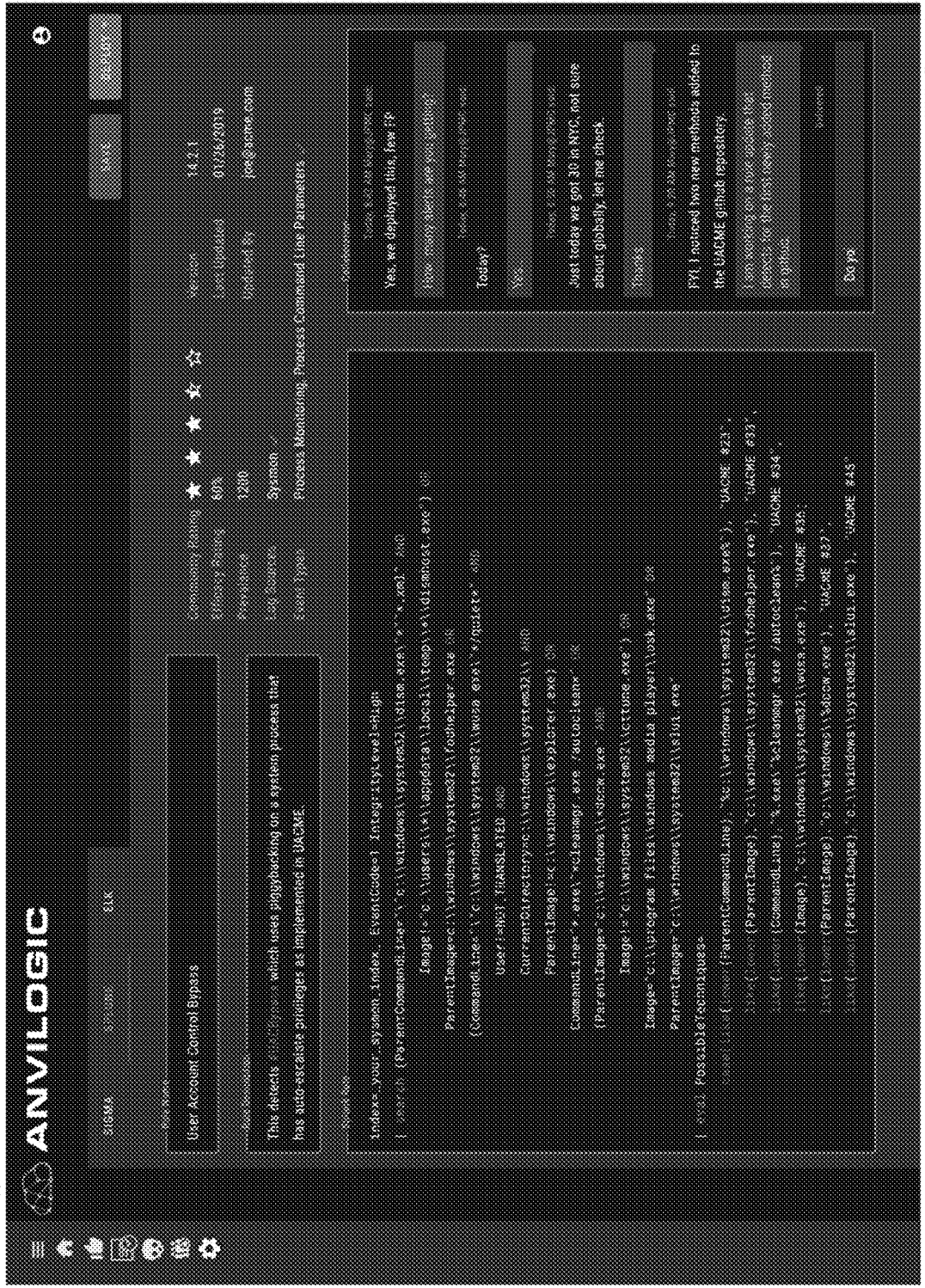

FIG. 4C depicts an example a recommended rule in response to an enterprise analyst query page 420 for the described platform. The rule is for detecting a specific type of threat procedure the "User Account Control Bypass."

Figure 4D:
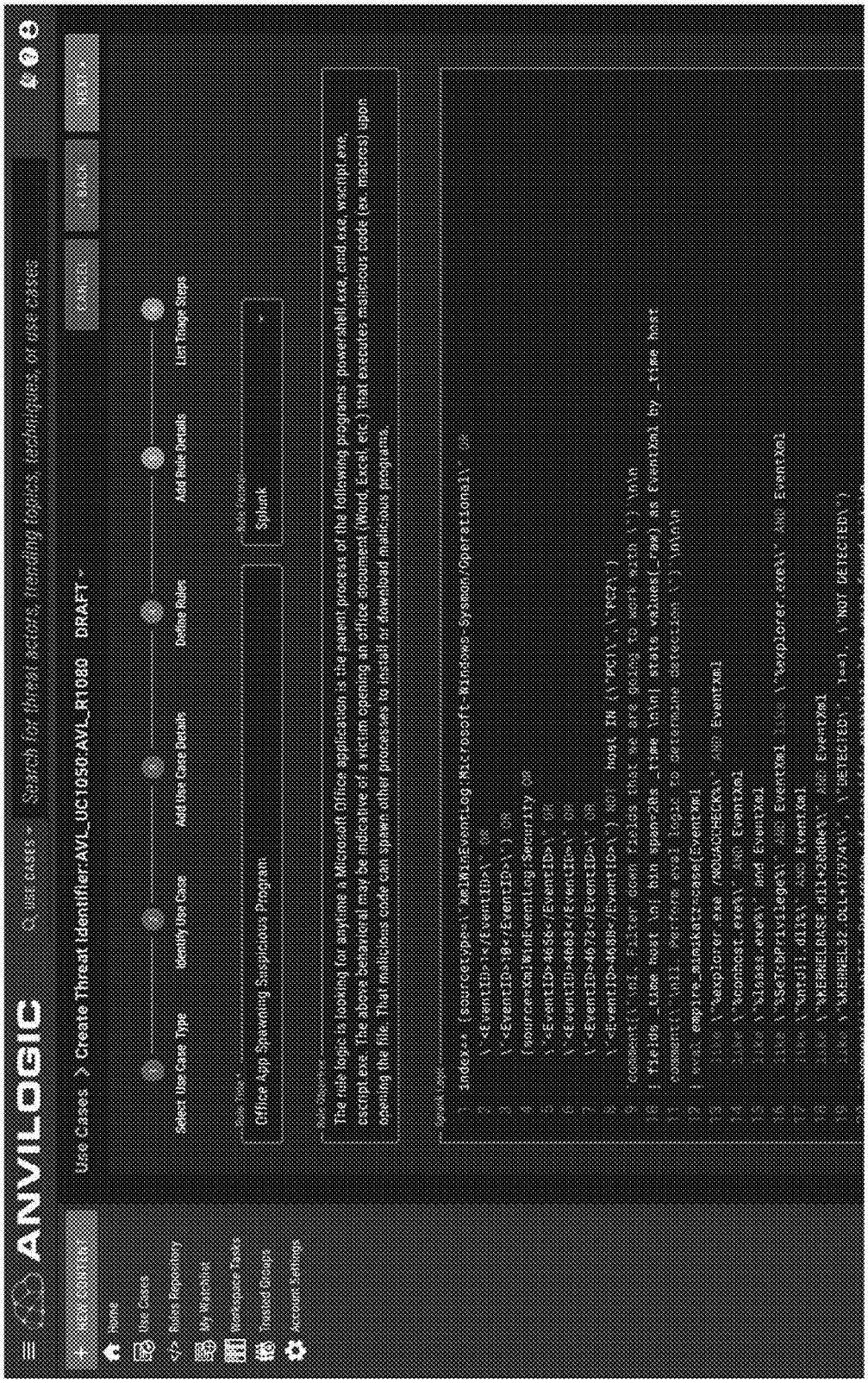

FIG. 4D depicts an example page 430 that can be employed to develop of new detection content in the platform.

Example Processes

Figure 5:
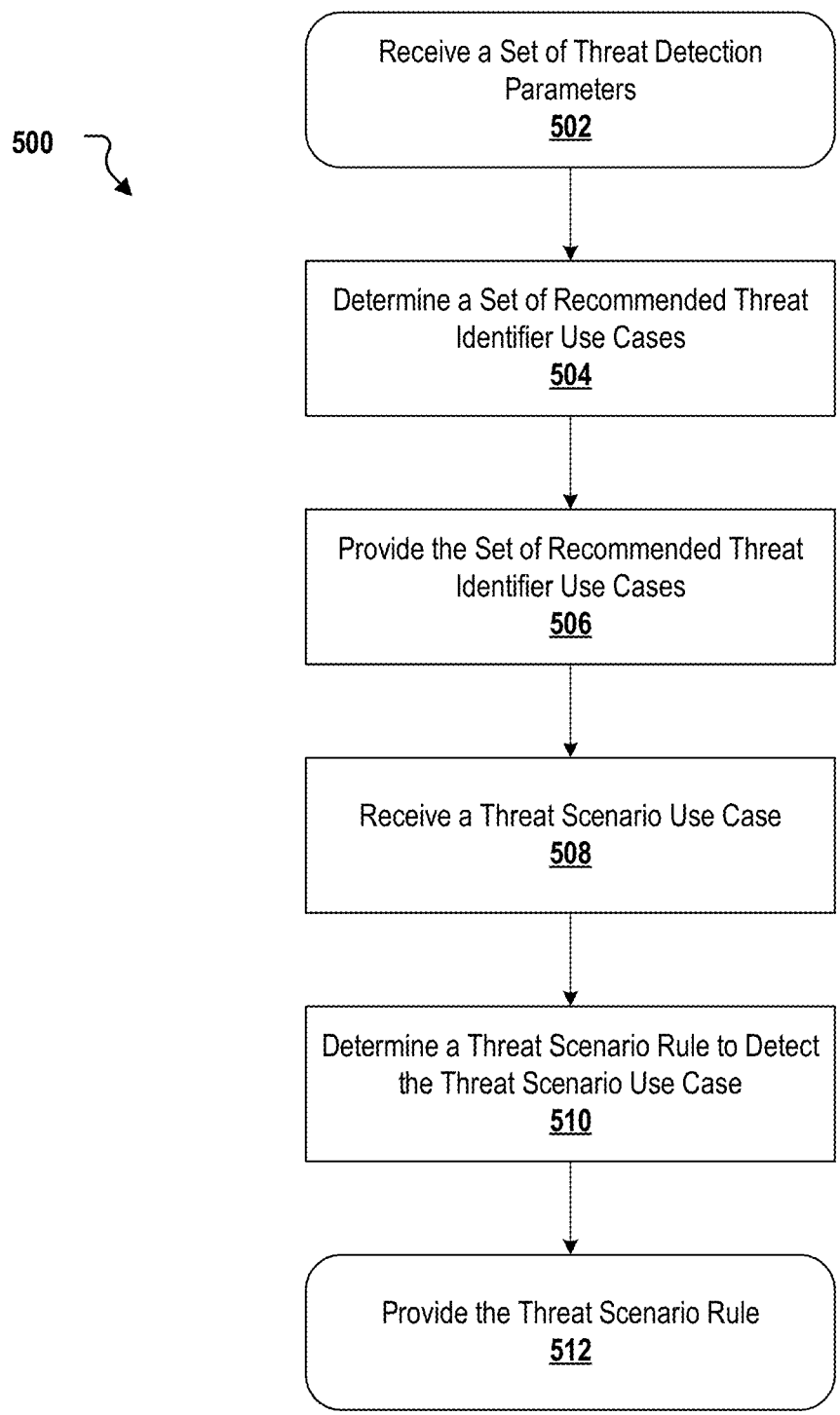
FIG. 5 depicts a flowchart of a non-limiting examples process that can be implemented by embodiments of the present disclosure.

FIG. 5 depicts a flowchart of an example process 500 that can be implemented by embodiments of the present disclosure. The example process 500 can be implemented by the components of the described platform, such as described above in FIGS. 1A-1B, 2A-2E, and 3. The example process 500 generally shows in more detail how a threat scenario rule comprising logic to detect the threat scenario use case is determined based on a set of threat detection parameters initially provide through an interface.

For clarity of presentation, the description that follows generally describes the example process 500 in the context of FIGS. 1A-4D, and 6-7. However, it will be understood that the process 500 may be performed, for example, by any other suitable system, environment, software, and hardware, or a combination of systems, environments, software, and hardware as appropriate. In some embodiments, various operations of the process 500 can be run in parallel, in combination, in loops, or in any order.

At 502, a set of threat detection parameters is received from an interface. In some embodiments, the set of threat detection parameters comprise an industry type, a type of adversary to detect, or a type of attack to detect. In some embodiments, the interface comprises a UI. From 502, the process 500 proceeds to 504.

At 504, a set of recommended threat identifier use cases is determined from a plurality of threat identifier use cases based on the set of threat detection parameters. In some embodiments, the plurality of threat identifier use cases are determined by processing raw event data through a trained machine learning model. In some embodiments, the raw event data comprises enterprise log data of attacks and traffic detected on a respective network. In some embodiments, the machine learning model is retrained with the determined threat identifier use cases. In some embodiments, the set of recommended threat identifier use cases is determined according to a threat score assigned to each of the plurality of threat identifier use cases. In some embodiments, the threat score is determined according to the set of threat detection parameters. In some embodiments, the plurality of threat identifier use cases are categorized as signature, behavioral, baseline, or machine learning. In some embodiments, at least one of the threat identifier rules is generated based on the selection of the set of recommended threat identifier use cases. From 504, the process 500 proceeds to 506.

At 506, the set of recommended threat identifier use cases is provide to the interface. From 506, the process 500 proceeds to 508.

At 508, a threat scenario use case comprising a selection of the set of recommended threat identifier use cases is received from the interface. In some embodiments, the threat scenario use case corresponds to an attack scenario or specific malicious activity. In some embodiments, the threat scenario use case is categorized as sequential correlation, risk threshold, or adversary recognition. In some embodiments, the threat scenario rule is provided via an API. In some embodiments, the threat scenario rule is provided to a custom container or application on top of a STEM. From 508, the process 500 proceeds to 510.

At 510, a threat scenario rule comprising logic to detect the threat scenario use case is determined. In some embodiments, modifications to the threat scenario rule or versioning data for the threat scenario rule are received from the interface. In some embodiments, the threat scenario rule comprises at least one version. In some embodiments, efficacy of the threat scenario rule is tracked across the versions of the threat scenario rule. In some embodiments, the threat scenario rule is determined by modifying at least on existing threat scenario rule or combining a plurality of threat identifier rules. From 510, the process 500 proceeds to 512.

At 512, the threat scenario rule is provided to the interface. In some embodiments, the threat scenario rule is deployed to a SIEM to detect SOI based on data collected at the STEM from enterprise sources. In some embodiments, the SOI correspond to the threat scenario use case. In some embodiments, the data collected from the enterprise sources comprises raw event feeds or data models that align to logs application, endpoint, network, authentication, email, or cloud data sets. In some embodiments, the threat scenario rule comprises a threat identifier rule for each of the respective selections from the set of recommended threat identifier use cases. In some embodiments, each of the threat identifier rules is deployed at a STEM to detect EOI based on data collected from enterprise sources. In some embodiments, the EOI correspond to the respective threat identifier use case. In some embodiments, a mode is selected for each of the deployed threat identifier rules. In some embodiments, the mode is either an alert mode or a warn mode. From 512, the process 500 ends.

Processing Devices and Processors

In some embodiments, the platforms, systems, media, and methods described herein include a computer, or use of the same. In further embodiments, the computer includes one or more hardware central processing units (CPUs) or general purpose graphics processing units (GPGPUs) that carry out the device's functions. In still further embodiments, the computer comprises an operating system configured to perform executable instructions. In some embodiments, the computer is optionally connected a computer network. In further embodiments, the computer is optionally connected to the Internet such that it accesses the World Wide Web. In still further embodiments, the computer is optionally connected to a cloud computing infrastructure. In other embodiments, the computer is optionally connected to an intranet. In other embodiments, the computer is optionally connected to a data storage device.

In accordance with the description herein, suitable computers include, by way of non-limiting examples, server computers, desktop computers, laptop computers, notebook computers, sub-notebook computers, netbook computers, netpad computers, handheld computers, Internet appliances, mobile smartphones, tablet computers, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the computer includes an operating system configured to perform executable instructions. The operating system is, for example, software, including programs and data, which manages the device's hardware and provides services for execution of applications. Those of skill in the art will recognize that suitable server operating systems include, by way of non-limiting examples, Free-BSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage or memory device. The storage or memory device is one or more physical apparatuses used to store data or programs on a temporary or permanent basis. In some embodiments, the device is volatile memory and requires power to maintain stored information. In some embodiments, the device is non-volatile memory and retains stored information when the computer is not powered. In further embodiments, the non-volatile memory comprises flash memory. In some embodiments, the volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, compact disc read-only memory (CD-ROM), digital versatile disc (DVD), flash memory devices, magnetic disk drives, magnetic tapes drives, optical disk drives, and cloud computing-based storage. In further embodiments, the storage or memory device is a combination of devices such as those disclosed herein.

In some embodiments, the computer includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with a computer, such as a virtual reality (VR) headset. In further embodiments, suitable VR headsets include, by way of non-limiting examples, HTC Vive, Oculus Rift, Samsung Gear VR, Microsoft HoloLens, Razer Open-Source Virtual Reality (OSVR), FOVE VR, Zeiss VR One, Avegant Glyph, Freefly VR headset, and the like. In still further embodiments, the display is a combination of devices such as those disclosed herein.

In some embodiments, the computer includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 6:
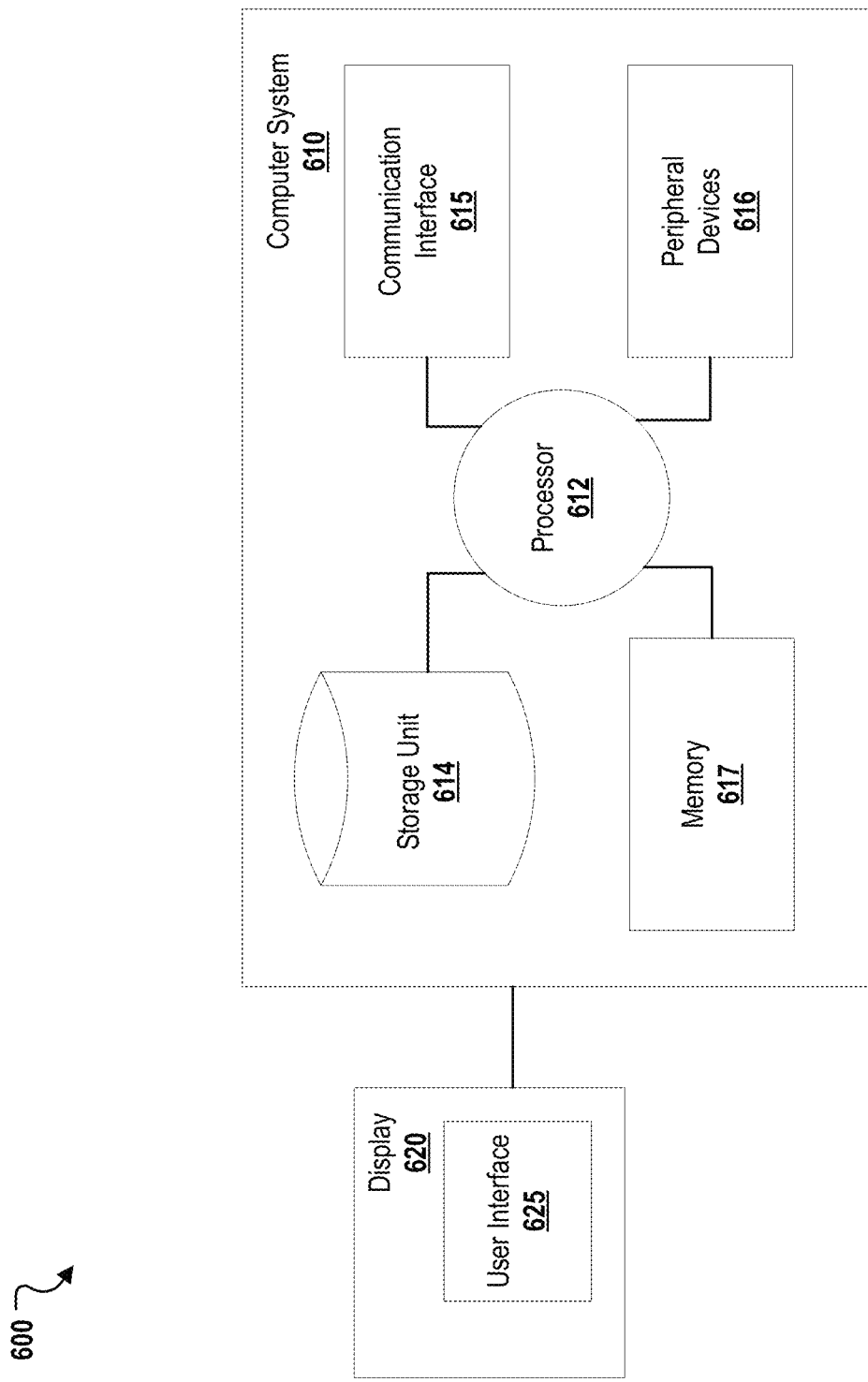
FIG. 6 depicts a non-limiting example a computer system that can be programmed or otherwise configured to implement methods or systems of the present disclosure.

Computer control systems are provided herein that can be used to implement the platforms, systems, media, and methods of the disclosure. FIG. 6 depicts an example a computer system 610 that can be programmed or otherwise configured to implement platforms, systems, media, and methods of the present disclosure. For example, the computing device 610 can be programmed or otherwise configured to display a user-interface or application provided by the described platform.

In the depicted embodiment, the computing device 610 includes a CPU (also "processor" and "computer processor" herein) 612, which is optionally a single core, a multi core processor, or a plurality of processors for parallel processing. The computing device 610 also includes memory or memory location 617 (e.g., random-access memory, read-only memory, flash memory), electronic storage unit 614 (e.g., hard disk), communication interface 615 (e.g., a network adapter) for communicating with one or more other systems, and peripheral devices 616, such as cache, other memory, data storage or electronic display adapters. In some embodiments, the memory 617, storage unit 614, interface 615 and peripheral devices 616 are in communication with the CPU 612 through a communication bus (solid lines), such as a motherboard. The storage unit 614 comprises a data storage unit (or data repository) for storing data. The computing device 610 is optionally operatively coupled to a computer network, such as the network 710 depicted and described in FIG. 7, with the aid of the communication interface 615. In some embodiments, the computing device 610 is configured as a back-end server deployed within the described platform.

In some embodiments, the CPU 612 can execute a sequence of machine-readable instructions, which can be embodied in a program or software. The instructions may be stored in a memory location, such as the memory 617. The instructions can be directed to the CPU 612, which can subsequently program or otherwise configure the CPU 612 to implement methods of the present disclosure. Examples of operations performed by the CPU 612 can include fetch, decode, execute, and write back. In some embodiments, the CPU 612 is part of a circuit, such as an integrated circuit. One or more other components of the computing device 610 can be optionally included in the circuit. In some embodiments, the circuit is an application specific integrated circuit (ASIC) or a FPGA.

In some embodiments, the storage unit 614 stores files, such as drivers, libraries and saved programs. In some embodiments, the storage unit 614 stores data, such as detection logic; analysis of various threats that have been encountered by an enterprise; metadata regarding triage performed to mitigate threats, false positives, and performance metrics, and so forth. In some embodiments, the computing device 610 includes one or more additional data storage units that are external, such as located on a remote server that is in communication through an intranet or the internet.

Figure 7:
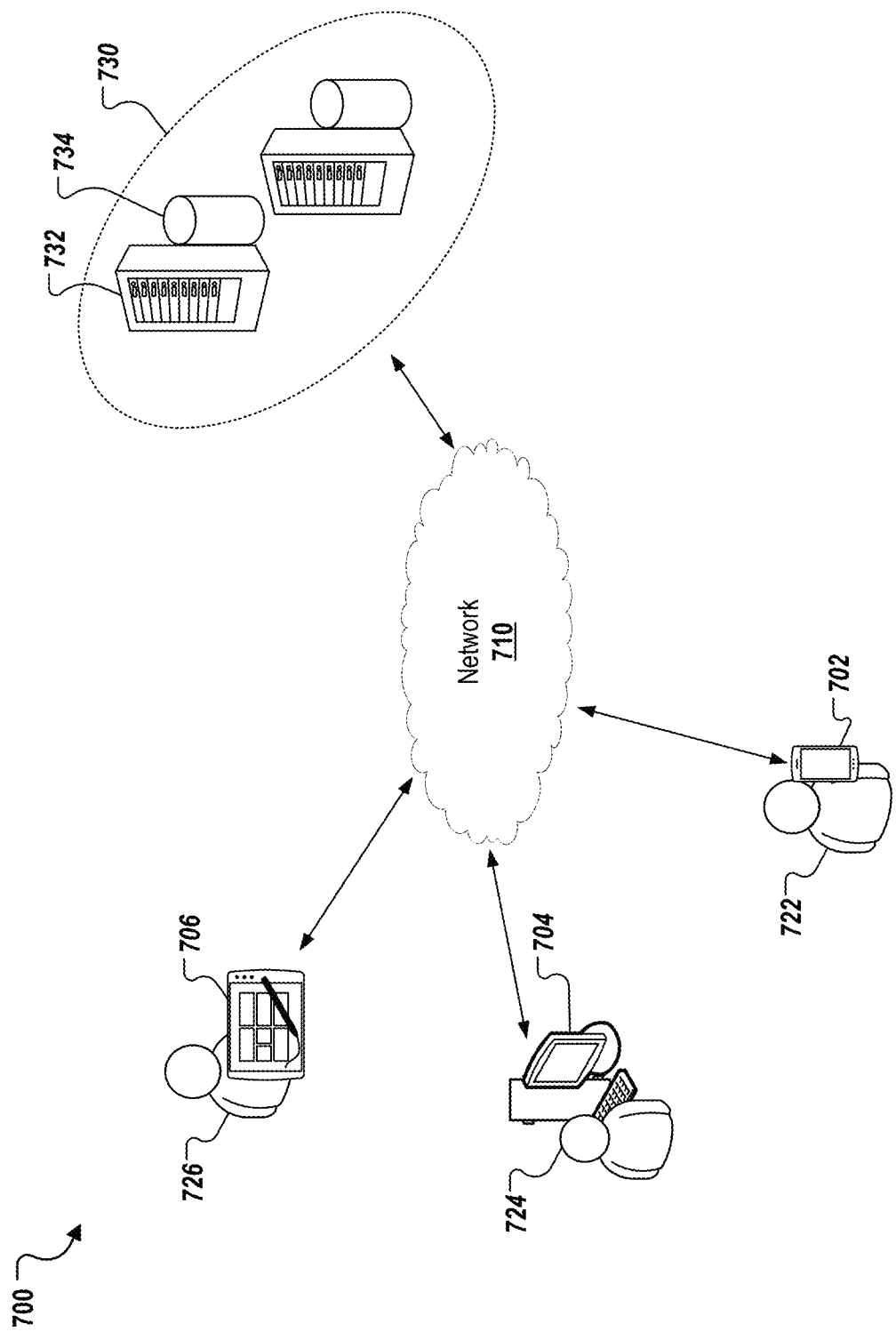
FIG. 7 depicts a non-limiting example environment that can be employed to execute embodiments of the present disclosure.

In some embodiments, the computing device 610 communicates with one or more remote computer systems through a network. For instance, the computing device 610 can communicate with a remote computer system. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants, such as depicted in FIG. 7. In some embodiments, a user can access the computing device 610 via a network.

In some embodiments, the platforms, systems, media, and methods as described herein are implemented by way of machine (e.g., computer processor) executable code stored on an electronic storage location of the computing device 610, such as, for example, on the memory 617 or the electronic storage unit 614. In some embodiments, the CPU 612 is adapted to execute the code. In some embodiments, the machine executable or machine-readable code is provided in the form of software. In some embodiments, during use, the code is executed by the CPU 612. In some embodiments, the code is retrieved from the storage unit 614 and stored on the memory 617 for ready access by the CPU 612. In some situations, the electronic storage unit 614 is precluded, and machine-executable instructions are stored on the memory 617. In some embodiments, the code is precompiled. In some embodiments, the code is compiled during runtime. The code can be supplied in a programming language that can be selected to enable the code to execute in a pre-compiled or as-compiled fashion.

In some embodiments, the computing device 610 can include or be in communication with an electronic display 620. In some embodiments, the electronic display 620 provides a UI 625 that depicts various screen, such as the examples depicted in FIGS. 4A-4D.

FIG. 7 depicts an example environment 700 that can be employed to execute embodiments of the present disclosure. The example system 700 includes computing devices 702, 704, 706, a back-end system 730, and a network 710. In some embodiments, the network 710 includes a local area network (LAN), wide area network (WAN), the Internet, or a combination thereof, and connects web sites, devices (e.g., the computing devices 702, 704, and 706) and back-end systems (e.g., the back-end system 730). In some embodiments, the network 710 includes the Internet, an intranet, an extranet, or an intranet or extranet that is in communication with the Internet. In some embodiments, the network 710 includes a telecommunication or a data network. In some embodiments, the network 710 can be accessed over a wired or a wireless communications link. For example, mobile computing devices (e.g., the smartphone device 702 and the tablet device 706), can use a cellular network to access the network 710.

The described platform may be employed within the example environment 700 to, for example, employ machine learning/AI techniques for processing detection logic (e.g., detection rules) through a machine-learning algorithm to determine enriched logic, the machine learning algorithm having been trained with, for example, previously received detection rules and metadata regarding the respective enterprises from which the rule were received.

In some examples, the users 722, 724, and 726 interact with the described platform through a graphical user interface (GUI), such as depicted in FIGS. 4A-4D, or application that is installed and executing on their respective computing devices 702, 704, and 706. In some examples, the computing devices 702, 704, and 706 provide viewing data to screens with which the users 722, 724, and 726, can interact. In some embodiments, the computing devices 702, 704, 706 are sustainably similar to computing device 610 depicted in FIG. 6. The computing devices 702, 704, 706 may each include any appropriate type of computing device, such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. Three user computing devices 702, 704, and 706 are depicted in FIG. 7 for simplicity. In the depicted example environment 700, the computing device 702 is depicted as a smartphone, the computing device 704 is depicted as a tablet-computing device, and the computing device 706 is depicted a desktop computing device. It is contemplated, however, that embodiments of the present disclosure can be realized with any of the appropriate computing devices, such as those mentioned previously. Moreover, embodiments of the present disclosure can employ any number of devices as required.

In the depicted example environment 700, the back-end system 730 includes at least one server device 732 and at least one data store 734. In some embodiments, the device 732 is sustainably similar to computing device 610 depicted in FIG. 6. In some embodiments, the back-end system 730 may include server-class hardware type devices. In some embodiments, the server device 732 is a server-class hardware type device. In some embodiments, the back-end system 730 includes computer systems using clustered computers and components to act as a single pool of seamless resources when accessed through the network 710. For example, such embodiments may be used in data center, cloud computing, storage area network (SAN), and network attached storage (NAS) applications. In some embodiments, the back-end system 730 is deployed using a virtual machine(s). In some embodiments, the data store 734 is a repository for persistently storing and managing collections of data. Example data store that may be employed within the described platform include data repositories, such as a database as well as simpler store types, such as files, emails, and so forth. In some embodiments, the data store 734 includes a database. In some embodiments, a database is a series of bytes or an organized collection of data that is managed by a database management system (DBMS).

In some embodiments, the at least one server system 732 hosts one or more computer-implemented services, such as described above in FIGS. 1A-1B, 2A-2E, and 3, provided by the described platform that users 722, 724, and 726 can interact with using the respective computing devices 702, 704, and 706.

Non-Transitory Computer Readable Storage Medium

In some embodiments, the platforms, systems, media, and methods disclosed herein include one or more non-transitory computer readable storage media encoded with a program including instructions executable by the operating system of an optionally networked computer. In further embodiments, a computer readable storage medium is a tangible component of a computer. In still further embodiments, a computer readable storage medium is optionally removable from a computer. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the computer's CPU, written to perform a specified task. Computer readable instructions may be implemented as program modules, such as functions, objects, API, data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof Machine Learning In some embodiments, machine learning algorithms are employed to build a model to determine detection logic, such as a set of detection rules, to provide to an enterprise. Examples of machine learning algorithms may include a support vector machine (SVM), a naïve Bayes classification, a random forest, a neural network, deep learning, or other supervised learning algorithm or unsupervised learning algorithm for classification and regression. The machine learning algorithms may be trained using one or more training datasets. For example, previously received detection rules, threat information, triage information, contextual information and so forth may be employed to train various algorithms. Moreover, as described above, these algorithms can be continuously trained/retrained using real-time data as it is determined or otherwise acquired by the described platform. In some embodiments, the machine learning algorithm employs regression modelling where relationships between variables are determined and weighted. In some embodiments, the machine learning algorithm employ regression modelling. In some embodiments, relationships between predictor variables and dependent variables are determined and weighted.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and eXtensible Markup Language (XML) database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or XML. In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™ JavaServer Pages (JSP), Hypertext Preprocessor (PHP), Python™, Ruby, Tcl, Smalltalk, WebDNA®, or Groovy. In some embodiments, a web application is written to some extent in a database query language such as SQL. In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight Java™, and Unity®.

Mobile Application

In some embodiments, a computer program includes a mobile application provided to a mobile computer. In some embodiments, the mobile application is provided to a mobile computer at the time it is manufactured. In other embodiments, the mobile application is provided to a mobile computer via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable compiled applications.

Software Modules

In some embodiments, the platforms, systems, media, and methods disclosed herein include software, server, or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Data Stores

In some embodiments, the platforms, systems, media, and methods disclosed herein include one or more data stores. In view of the disclosure provided herein, those of skill in the art will recognize that data stores are repositories for persistently storing and managing collections of data. Types of data stores repositories include, for example, databases and simpler store types, or use of the same. Simpler store types include files, emails, and so forth. In some embodiments, a database is a series of bytes that is managed by a DBMS. Many databases are suitable for receiving various types of data, such as scenario, threat, rule, and logic data. In various embodiments, suitable databases include, by way of non-limiting examples, relational databases, non-relational databases, object-oriented databases, object databases, entity-relationship model databases, associative databases, and XML databases. Further non-limiting examples include SQL, PostgreSQL, MySQL, Oracle, DB2, and Sybase. In some embodiments, a database is internet-based. In some embodiments, a database is web-based. In some embodiments, a database is cloud computing-based. In some embodiments, a database is based on one or more local computer storage devices.

While preferred embodiments of the present subject matter have been shown and described herein, it will be obvious to those skilled in the art that such embodiments are provided by way of example only. Numerous variations, changes, and substitutions will now occur to those skilled in the art without departing from the present disclosure. It should be understood that various alternatives to the embodiments of the subject matter described herein may be employed.

What is claimed is:

1. A computer-implemented method for providing a threat scenario rule to detect a specified threat scenario use case, the method being executed by one or more processors and comprising:
   providing a user interface configured to perform functions comprising:
      enable an enterprise user to select, define, and edit the threat scenario use case, the threat scenario use case comprising a plurality of stages corresponding to an attack sequence of interest to the enterprise;
      enable the enterprise user to identify a set of threat detection parameters customized for the threat environment of the enterprise; and
      enable the enterprise user to select, define, and edit threat identifier use cases for detecting events of interest in a Security Incident and Event Management (SIEM) environment of the enterprise;
   receiving, from the user interface, a definition of the threat scenario use case in terms of the stages;
   receiving, from the user interface, the set of threat detection parameters;
   receiving, from an agent running at the enterprise, event log metadata;
   determining a set of recommended threat identifier use cases from a plurality of threat identifier use cases based at least on the definition of the threat scenario use case, the set of threat detection parameters, and the enterprise event log metadata, wherein each threat identifier use case comprises one or more events of interest (EOI) that are normalized and tagged with attack indicators comprising attack phase, domain of detection, and known adversaries deploying the attack;
   providing, to the user interface, the set of recommended threat identifier use cases;
   receiving, from the user interface, the threat scenario use case comprising a selection of the set of recommended threat identifier use cases;
   determining the threat scenario rule comprising logic to detect the threat scenario use case based at least on the selection of the set of recommended threat identifier use cases, wherein the threat scenario rule is determined by modifying at least one existing threat identifier rule, combining a plurality of threat identifier rules, or both modifying at least one existing threat identifier rule and combining a plurality of threat identifier rules, wherein the threat scenario rule comprises at least one version, and wherein the threat scenario rule is determined automatically without coding by the enterprise user;
   providing the threat scenario rule to the user interface;
   training a machine learning model using the threat scenario rule, including the selection of the set of recommended threat identifier use cases, to detect the threat scenario use case in the SIEM environment of the enterprise; and tracking efficacy of the threat scenario rule across the versions of the threat scenario rule.

2. The method of claim 1, wherein the threat scenario rule is deployed to the SIEM environment to detect scenarios of interest (SOI) based on data collected at the SIEM environment from enterprise sources, and wherein the SOI correspond to the threat scenario use case.

3. The method of claim 2, wherein the data collected from the enterprise sources comprises raw event feeds or data models that align to logs application, endpoint, network, authentication, email, or cloud data sets.

4. The method of claim 1, wherein the threat scenario rule comprises a threat identifier rule for each of the respective selections from the set of recommended threat identifier use cases.

5. The method of claim 4, wherein each of the threat identifier rules is deployed at the SIEM environment to detect the EOI based on data collected from enterprise sources, and wherein the EOI correspond to the respective threat identifier use case.

6. The method of claim 5, wherein a mode is selected for each of the deployed threat identifier rules.

7. The method of claim 6, wherein the mode is either an alert mode or a warn mode.

8. The method of claim 1, wherein the threat scenario use case corresponds to an attack scenario or specific malicious activity.

9. The method of claim 1, wherein the plurality threat identifier use cases are determined by processing raw event data through the trained machine learning model.

10. The method of claim 9, wherein the raw event data comprises enterprise log data of attacks and traffic detected on a respective network.

11. The method of claim 9, wherein the machine learning model is retrained with the determined threat identifier use cases.

12. The method of claim 1, wherein the set of recommended threat identifier use cases is determined according to a threat score assigned to each of the plurality of threat identifier use cases, and wherein the threat score is determined according to the set of threat detection parameters.

13. The method of claim 1, wherein the set of threat detection parameters comprise an industry type, a type of adversary to detect, or a type of attack to detect.

14. The method of claim 1, wherein the plurality of threat identifier use cases are categorized as signature, behavioral, baseline, or machine learning.

15. The method of claim 1, wherein the threat scenario use case is categorized as sequential correlation, risk threshold, or adversary recognition.

16. The method of claim 1, wherein the threat scenario rule is provided via an application programming interface (API).

17. The method of claim 1, wherein the threat scenario rule is provided to a custom container or application on top of the SIEM environment.

18. The method of claim 1, wherein the user interface comprises a graphical user interface (GUI).

19. The method of claim 1, comprising:
receiving, from the interface, modifications to the threat scenario rule or versioning data for the threat scenario rule.

20. One or more non-transitory computer-readable storage media coupled to one or more processors and having instructions stored thereon which, when executed by the one or more processors, cause the one or more processors to perform operations comprising:

providing a user interface configured to perform functions comprising:
enable an enterprise user to select, define, and edit the threat scenario use case, the threat scenario use case comprising a plurality of stages corresponding to an attack sequence of interest to the enterprise;
enable the enterprise user to identify a set of threat detection parameters customized for the threat environment of the enterprise; and
enable the enterprise user to select, define, and edit threat identifier use cases for detecting events of interest in a Security Incident and Event Management (STEM) environment of the enterprise;

receiving, from the user interface, a definition of the threat scenario use case in terms of the stages;
receiving, from the user interface, the set of threat detection parameters;
receiving, from an agent running at the enterprise, event log metadata;
determining a set of recommended threat identifier use cases from a plurality of threat identifier use cases based at least on the definition of the threat scenario use case, the set of threat detection parameters, and the enterprise event log metadata, wherein each threat identifier use case comprises one or more events of interest (EOI) that are normalized and tagged with attack indicators comprising attack phase, domain of detection, and known adversaries deploying the attack;
providing, to the user interface, the set of recommended threat identifier use cases;
receiving, from the user interface, the threat scenario use case comprising a selection of the set of recommended threat identifier use cases;
determining the threat scenario rule comprising logic to detect the threat scenario use case based at least on the selection of the set of recommended threat identifier use cases, wherein the threat scenario rule is determined by modifying at least one existing threat identifier rule, combining a plurality of threat identifier rules, or both modifying at least one existing threat identifier rule and combining a plurality of threat identifier rules, wherein the threat scenario rule comprises at least one version, and wherein the threat scenario rule is determined automatically without coding by the enterprise user;
providing the threat scenario rule to the user interface;
training a machine learning model using the threat scenario rule, including the selection of the set of recommended threat identifier use cases, to detect the threat scenario use case in the SIEM environment of the enterprise; and
tracking efficacy of the threat scenario rule across the versions of the threat scenario rule.

21. A system for providing a threat scenario rule to detect a specified threat scenario use case comprising:
an interface;
one or more processors; and
a non-transitory computer-readable storage device coupled to the one or more processors and having instructions stored thereon which, when executed by the one or more processors, cause the one or more processors to perform operations comprising:
providing a user interface configured to perform functions comprising:

enable an enterprise user to select, define, and edit the threat scenario use case, the threat scenario use case comprising a plurality of stages corresponding to an attack sequence of interest to the enterprise;

enable the enterprise user to identify a set of threat detection parameters customized for the threat environment of the enterprise; and enable the enterprise user to select, define, and edit threat identifier use cases for detecting events of interest in a Security Incident and Event Management (SIEM) environment of the enterprise;

receiving, from the user interface, a definition of the threat scenario use case in terms of the stages;

receiving, from the user interface, the set of threat detection parameters;

receiving, from an agent running at the enterprise, event log metadata;

determining a set of recommended threat identifier use cases from a plurality of threat identifier use cases based at least on the definition of the threat scenario use case, the set of threat detection parameters, and the enterprise event log metadata, wherein each threat identifier use case comprises one or more events of interest (EOI) that are normalized and tagged with attack indicators comprising attack phase, domain of detection, and known adversaries deploying the attack;

providing, to the user interface, the set of recommended threat identifier use cases;

receiving, from the user interface, the threat scenario use case comprising a selection of the set of recommended threat identifier use cases;

determining the threat scenario rule comprising logic to detect the threat scenario use case based at least on the selection of the set of recommended threat identifier use cases, wherein the threat scenario rule is determined by modifying at least one existing threat identifier rule, combining a plurality of threat identifier rules, or both modifying at least one existing threat identifier rule and combining a plurality of threat identifier rules, wherein the threat scenario rule comprises at least one version, and wherein the threat scenario rule is determined automatically without coding by the enterprise user;

providing the threat scenario rule to the user interface;

training a machine learning model using the threat scenario rule, including the selection of the set of recommended threat identifier use cases, to detect the threat scenario use case in the SIEM environment of the enterprise; and tracking efficacy of the threat scenario rule across the versions of the threat scenario rule.

22. The method of claim 1, wherein the user interface comprises drag and drop functionality.

23. The non-transitory computer-readable storage media of claim 20, wherein the user interface comprises drag and drop functionality.

24. The system of claim 21, wherein the user interface comprises drag and drop functionality.

25. The method of claim 1, further comprising automatically generating custom code for the threat scenario rule to detect the threat scenario use case, the custom code executable in the SIEM environment of the enterprise.

26. The non-transitory computer-readable storage media of claim 20, wherein the operations further comprise automatically generating custom code for the threat scenario rule to detect the threat scenario use case, the custom code executable in the SIEM environment of the enterprise.

27. The system of claim 21, wherein the operations further comprise automatically generating custom code for the threat scenario rule to detect the threat scenario use case, the custom code executable in the SIEM environment of the enterprise.

* * * * *